(12) United States Patent
Okamoto et al.

(10) Patent No.: US 6,580,484 B2
(45) Date of Patent: *Jun. 17, 2003

(54) LAMINATED PHASE PLATE AND LIQUID CRYSTAL DISPLAY COMPRISING THE LAMINATED PHASE PLATE

(75) Inventors: Masayuki Okamoto, Kashiwa (JP); Seiichi Mitsui, Kashiwa (JP); Hajime Hiraki, Ichikawa (JP); Shun Ueki, Matsudo (JP); Kiyoshi Minoura, Kashiwa (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,869
(22) PCT Filed: Apr. 24, 1998
(86) PCT No.: PCT/JP98/01925
§ 371 (c)(1),
(2), (4) Date: Oct. 28, 1999
(87) PCT Pub. No.: WO98/52093
PCT Pub. Date: Nov. 19, 1998

(65) Prior Publication Data
US 2002/0063826 A1 May 30, 2002

(30) Foreign Application Priority Data
May 9, 1997 (JP) .............................. 9-119400

(51) Int. Cl.[7] ........................................... G02F 1/1335
(52) U.S. Cl. ....................................... 349/119; 349/117
(58) Field of Search ................................ 349/117, 119, 349/113

(56) References Cited

U.S. PATENT DOCUMENTS

| 4,701,028 A | 10/1987 | Clerc et al. |
| 5,220,444 A | 6/1993 | Mitsui et al. |
| 5,684,551 A | 11/1997 | Nakamura et al. |
| 5,691,791 A | 11/1997 | Nakamura et al. |
| 5,847,789 A | 12/1998 | Nakamura et al. |

FOREIGN PATENT DOCUMENTS

| EP | 0 699 938 | 3/1996 |
| JP | 55048733 | 4/1980 |
| JP | 2236523 | 9/1990 |
| JP | A4-190325 | 7/1992 |
| JP | A4-194820 | 7/1992 |
| JP | A4-215619 | 8/1992 |
| JP | 5100114 | 4/1993 |
| JP | 6167708 | 6/1994 |
| JP | A6-194647 | 7/1994 |
| JP | 6337421 | 12/1994 |
| JP | 8062564 | 3/1996 |

OTHER PUBLICATIONS

T. Sonehara et al.; A New Twisted Nematic ECB (TN–ECB) Mode for a Reflective Light Valve; Japan Display 1989; pp. 192–195.

H. Seki et al.; "LP–F: A New Reflective Display with High Multiplexibility and Gray Scale Capability"; Euro Display 1996; pp. 464–467.

*Primary Examiner*—Robert H. Kim
*Assistant Examiner*—Dung Nguyen
(74) *Attorney, Agent, or Firm*—Birch, Stewart, Kolasch & Birch, LLP

(57) ABSTRACT

A laminated phase plate is formed by laminating a first optical phase difference compensation plate, having a retardation between 100 and 180 nm for transmitted light, with a wavelength of 550 nm and a second optical phase difference compensation plate having a retardation between 200 and 360 nm for transmitted light with a wavelength of 550 nm. The optical phase difference compensation plates are arranged so that $|\theta1-(2\times\theta2)|$ is between 80 and 100 degrees. The term $\theta1$ is an angle between a vibration direction of linearly polarized light and a slow axis direction of the first optical phase difference compensation plate when the linearly polarized light, which is visible light and has a fixed plane of vibration, is incident on the second optical phase difference compensation plate. The term $\theta2$ is an angle between the vibration direction of linearly polarized light incident on the second optical phase difference compensation plate and a slow axis direction of the second optical phase difference compensation plate.

18 Claims, 27 Drawing Sheets

LAMINATED PHASE PLATE AND LIQUID CRYSTAL DISPLAY COMPRISING THE LAMINATED PHASE PLATE

This application is the national phase under 35 U.S.C. §371 of PCT International Application No. PCT/JP98/01925 which has an International filing date of Apr. 24, 1998, which designated the United States of America.

FIELD OF THE INVENTION

The present invention relates to a laminated phase plate for use in direct-viewing-type liquid crystal display devices used for office machinery including word processors and notebook-sized personal computers, various types of visual equipment and game equipment, a projection-type liquid crystal display device which displays an enlarged image by projecting an image of a reflective liquid crystal display illuminated by light source, and liquid crystal display devices such as a head-mount display which is fixed at the head of a viewer, and also relates to liquid crystal display devices incorporating the laminated phase plate.

BACKGROUND OF THE INVENTION

Conventionally, an optical phase difference compensation plate composed of an oriented polymer film has been used for various applications. Examples of the optical phase difference compensation plates includes a ¼ waveplate for giving a phase difference of π/2 between two linearly polarized lights having vibration planes perpendicular to each other, and a ½ waveplate for giving a phase difference of π between them. Since the phase differences of these optical phase difference compensation plates originated from their retardation vary according to the wavelength of light, it was difficult to provide a uniform polarization state, which is obtained as a result of a phase difference, for lights of different wavelengths by a structure including only a single optical phase difference compensation plate.

In order to solve such a drawback, Japanese laid-open patent publication No. (Tokukaihei) 5-100114 discloses a ½ waveplate produced by a combination of a polarizer and a plurality of ½ waveplates, and a circular polarizer obtained by further adding a ¼ waveplate to the combination.

In the former structure of these structures, by combining ½ waveplates, a condition for giving a phase difference of π to light whose linearly polarized component has been selectively transmitted by the polarizer is ensured within a wide wavelength range. On the other hand, in the latter structure, a condition for giving a phase difference of π/2 is ensured within a wide wavelength range by adding a ¼ waveplate to the above-mentioned structure. As a result, light having a wavelength within a range satisfying the ½ wavelength condition for giving a phase difference of π becomes linearly polarized light oriented in a different direction from linearly polarized light prepared by a polarizer. With this structure, it is possible to produce linearly polarized light having a uniform vibration plane for wavelengths satisfying the ½ wavelength condition.

Moreover, as a color display, a liquid crystal display device having thin and light weight characteristics has been put to practical use. At present, a transmissive type liquid crystal display device using a light source as an illumination from behind has been most widely used as a color display device, and the application thereof has increased to various fields because of the above-mentioned characteristics.

A reflective type liquid crystal display device does not require a backlight for display, and therefore it can lower the power consumption by cutting the power for the light source and reduce the space and weight by the space and weight of the backlight as compared with the transmissive type liquid crystal display device. In other words, the reflective type liquid crystal display device can achieve a reduction in the power consumption, and is suitable for use in apparatuses aiming at reductions in their thickness and weights.

Furthermore, regarding the contrast characteristic of the display screen, in a light emitting type display devices as CRTs, a substantial degradation in the contrast ratio, i.e., a so-called washout, occurs outdoors in daylight. Besides, in this aspect, even in a transmissive type liquid crystal display device to which a low reflection treatment was applied, a lowering of visibility is unavoidable in an environment in which ambient light such as direct sunlight is extremely strong compared with display light.

On the other hand, in the reflective type liquid crystal device, since display light proportional to the amount of ambient light is obtained, the reflective type liquid crystal device is particularly suitable for use as a display section of apparatuses used in outdoor, such as personal digital tools, digital still cameras, and portable comcorders.

However, although the reflective type liquid crystal display device has such very advantageous application fields, it does not have a sufficient contrast ratio and reflectivity, and performances for achieving multicolor display, high definition display, moving image display, etc. Therefore, a reflective type color liquid crystal display device having sufficient practical characteristics has not been realized so far.

The following description will explain a reflective type liquid crystal display device in detail.

Since a conventional twisted nematic (TN) liquid crystal element is constructed with the use of two polarizers, the contrast ratio and the viewing angle characteristic are improved. However, since a liquid crystal modulation layer and a light reflecting layer is separated from each other by a distance equal to the thickness of a substrate, etc., parallax occurs due to the difference between a light path along which illumination light is incident and a light path along which the light is outgoing. Thus, in particular, a structure in which the twisted nematic liquid crystal element is used for a normal conventional transmissive type liquid crystal display using a combination of a single liquid crystal modulation layer and color filters which apply a plurality of color elements to different pixels is not suitable for a high resolution, high definition color display device. The reason for this is that, when the traveling direction of light passing through a color element during the incidence of light and that of light passing through a color element after the light is reflected tilt with respect to each other, the light path varies according to the tilt direction and tilt angle. For such a reason, a color display of a reflective type liquid crystal display device using this display mode has not been put to practical use.

Meanwhile, a guest-host (GH) type liquid crystal display element in which no polarizer or one polarizer is used and dye is added to a liquid crystal has been developed. However, the guest-host type liquid crystal element suffers from problems that the reliability is not sufficient due to the addition of dye and a high contrast ratio is not obtained because the dichroism ratio of the dye is low. In particular, in a color display using color filters, since the reflected light of the pixel in the dark state is observed together with the reflected light of the pixel in the bright state, the color purity is substantially lowered by such an insufficient contrast. In order to prevent the degradation of color purity, it is necessary to apply color filters of high color purity. However, when color filters of high color purity are used, the brightness is lowered. Thus, there is a conflict between the lowering of brightness and an advantages of the GH technique of achieving a high brightness without using a polarizer because this advantage is spoilt.

In view of the above-mentioned circumstances, liquid crystal display devices employing a structure in which one polarizer which is expected to achieve a high resolution, high contrast display (hereinafter referred to as the single polarizer structure) have been developed. As one example, a reflective (450 twisted type) TN type liquid crystal display device using one polarizer and ¼ waveplates is disclosed in Japanese laid-open patent publication No. (Tokukaisho) 55-48733.

According to this prior art, a layer of liquid crystal twisted at 45° is used, and the vibration plane of incident linearly polarized light is switched between two states, i.e., a state in which the vibration plane is parallel to the optical axis of the ¼ waveplate and a state in which the vibration plane is oriented in a direction which differs from the direction of the optical axis by 45° by controlling an electric field applied to the liquid crystal layer so as to achieve a black and white display. This liquid crystal cell is constructed by arranging a polarizer, a 45°-twisted liquid crystal cell, a ¼ waveplate, and a reflector in this order from the incident side.

Additionally, the present inventors filed a patent application directed to a reflective type homogeneous structure realized by a combination of one polarizer, homogeneous alignment liquid crystal cell, and optical phase difference compensation plate (see Japanese laid-open paten publication No. (Tokukaihei) 6-167708). In this display mode, a homogeneous (no twisted planer) alignment liquid crystal layer and one optical phase difference compensation plate are placed between a reflector disposed on the inner surface of the liquid crystal cell and a polarizer provided on the outside of the liquid crystal cell (and optical phase difference compensation plate). In this structure, the light paths comprising the incident light path and outgoing light path pass through the polarizer only twice, and also pass through a transparent electrode, which is formed on one of glass substrates (upper substrate) of the cell and can not avoid light absorption, only twice. Therefore, with this cell structure, a high reflectivity can be obtained.

Furthermore, a structure in which a layer of twisted nematic liquid crystal is placed between a reflector (disposed on the inner surface of the cell) and one polarizer is disclosed in Japanese laid-open patent publication No. (Tokukaihei) 2-236523 and Japan Display '89, p. 192.

The following descriptions will explain the theory of such a single polarizer display as disclosed in Japanese lain-open patent publication Nos. (Tokukaihei) 6-167708 and 2-236523, and Japan Display '89, p. 192.

A polarizer disposed on the incident side transmits only linearly polarized components in one direction among linearly polarized components of incident light and outgoing light, and absorbs linearly polarized components in the directions perpendicular to the transmissive directions. The incident light which has been transmitted through the polarizer is changed in its polarization state by an optical phase difference compensation plate such as a ¼ waveplate and then incident on a liquid crystal layer (in the case of Japanese laid-open patent publication No. (Tokukaihei) 6-167708), or incident on the liquid crystal layer without a change in the polarization state (in the cases of Japanese laid-open patent publication No. (Tokukaihei) 2-236523 and Japan Display '89, p. 192). When the light incident on the liquid crystal layer passes through the liquid crystal layer, the polarization state thereof changes and the light reaches a reflector. The light which has reached the reflector passes through the liquid crystal layer and ¼ waveplate in reversed order to the order when it was incident, while changing in the polarization state, and reaches the polarizer again.

At this time, the final ratio of the polarized components in the transmitting direction of the polarizer determines the overall reflectivity of the liquid crystal layer. More specifically, the brightest display is obtained when the polarization state of the outgoing light just before passing through the polarizer is linear polarization in the transmitting direction of the polarizer, and the darkest display is obtained when the polarization is linear polarization in the absorbing direction.

The necessary and sufficient conditions for achieving these states with light which is normally incident on and outgoing from a liquid crystal display device are known as described below, but the detailed explanation thereof is omitted. In other words, the necessary and sufficient conditions are such that the polarization state on the reflector is linear polarization in any direction for the bright state, and the polarization state on the reflector is right- or left-handed circular polarization for the dark state. The above-mentioned conditions presume specular reflection without polarization scramble. In other words, with reflection which scrambles polarization, the brightness in the bright state is lowered, while the brightness in the dark state is increased, resulting in a degradation of the display contrast. Therefore, the reflection with polarization scramble is not suitable for the single polarizer structure aiming for a high contrast.

A reflective type liquid crystal display device in which one polarizer and a liquid crystal layer having a negative dielectric anisotropy and homeotropic alignment is disclosed. U.S. Pat. No. 4,701,028 (Clerc et al.) discloses a reflective type liquid crystal display device incorporating a combination of one polarizer, ¼ waveplate, and homeotropically aligned liquid crystal cell. Moreover, Japanese laid-open patent publication No. (Tokukaihei) 6-337421 discloses a reflective type liquid crystal display device incorporating a combination of one polarizer, ¼ waveplate, and hybrid aligned liquid crystal cell. Furthermore, a reflective type liquid crystal display device incorporating a combination of one polarizer, ¼ waveplate, and homeotropically aligned liquid crystal cell is disclosed in Euro Display '96, p. 464.

These devices are liquid crystal display devices which use a ¼ waveplate, realize a dark state by making the retardation of the liquid crystal layer substantially zero in the absence of applied voltage and maintaining the polarization state, and produce a bright state by applying a voltage so that the retardation of liquid crystal layer has a finite value, i.e., liquid crystal display devices of a so-called normally black mode in which switching is executed using the retardation.

On the other hand, a projection type liquid crystal display device has a mechanism for enlarging and projecting a display image produced by liquid crystal elements, and provide a large-area display by a small device compared with the size of the display image. Therefore, the projection type liquid crystal display device has been used widely in practical image display devices such as large display devices and data projectors.

In addition, a head-mount display is a small device, and has such characteristics that it effectively provides a large display screen to a viewer, occupies the field of view of the viewer because it is fixed at the head, and provides independent display information to right and left eyes. The application of the head-mount display to virtual reality techniques, high quality image displays, three-dimensional picture reproduction-use displays, etc. in future is expected because of the above-mentioned merits.

Among these projection type liquid crystal display device and head-mount display, a reflective type liquid crystal display device has an advantage that it enables the production of a device with a multi-functional driving substrate by fabricating the liquid crystal element and peripheral circuits into the same device and extracting the light incident on the liquid crystal element from the illuminated surface of the device. In other words, the above-mentioned reflective type liquid crystal display device has an advantage that the non-light-transmitting substrate such as silicon wafer is usable, and an advantage that active elements for driving the liquid crystal layer and wiring can be designed without deteriorating the utilization efficiency of light even when the liquid crystal display element is designed in a small size.

Alternatively, it is possible to employ a technique such as a so-called liquid crystal light valve. With the use of the liquid crystal light valve, display information is written by illuminating light from a side opposite to the light projection side of the substrates holding the liquid crystal element therebetween. With this structure, the resistance of a photoconductive layer is changed, the voltage is allocated with respect to the liquid crystal layer to which a voltage has been applied during the application of the voltage to the photoconductive layer, and the strength of the projected light is varied according to the writing light. It is thus possible to apply the above-mentioned reflective type liquid crystal display to the projection type devices. In particular, the efficiency of light is important because it determines the overall brightness of the device.

Besides, since there is a possibility that ambient lighting environments in observing the display of such a projection type liquid crystal display device or head-mount display are very dark, a high quality display is required. Hence, in order to achieve a high contrast display by realizing a good black display in such lighting environments, high light blocking properties are required for the black display.

Moreover, Japanese laid-open patent publication No. (Tokukaihei) 8-62564 discloses a technique as an example of a liquid crystal projection type liquid crystal display which is fabricated using a polarizing beam splitter and achieves a high contrast display with the use of an optical phase difference compensation plate. According to the structure disclosed in this publication, in order to achieve a high contrast display, an optical element (birefringence element) for producing a phase difference is used so as to compensate for the phase difference of the liquid crystal layer in the dark state.

In a structure in which a homogeneous liquid crystal cell is used in a single polarizer liquid crystal display device of the above-mentioned prior art, when a bright state is provided by the application of a voltage or when a bright state is provided by an alignment state in a homeotropic liquid crystal cell in which the birefringence of the liquid crystal layer substantially disappears in the absence of applied voltage, it is preferred to satisfy the following. Specifically, it is preferred that a polarization state after the outgoing of the light from the optical phase difference compensation plate to liquid crystal layer is made linearly polarized light by a combination of the polarizer of the liquid crystal display device achieving a good bright state in a wide wavelength range and the optical phase difference compensation plate. However, when the linearly polarized light has a fixed plane of vibration in every wavelength range, the function of the liquid crystal layer of compensating the differences in the functions of the polarization states in the respective wavelengths is not achieved.

If the above-mentioned two conditions, i.e., light of each wavelength is linearly polarized light and a polarization state where the direction of the vibration plane varies depending on the wavelength, are satisfied, the phase plate can be used as an optical phase difference compensation plate which can serve as a color compensation plate aiming for the optical compensating function of the liquid crystal layer.

According to the one disclosed in the above-mentioned Japanese laid-open patent publication No. (Tokukaihei) 5-100114, a method for obtaining a ½ wavelength condition for a wide wavelength range is provided. However, polarized lights of different wavelengths have vibration planes of the same direction, and the resultant polarization state differs only in the direction from the polarization state immediately after the passage through the polarizer. In other words, the polarization direction does not vary depending on the wavelength.

Moreover, in the descriptions of the above publication, it is also disclosed that lights in a wide wavelength range is made circularly polarized lights by a method of providing a ¼ wavelength condition for a wide wavelength range. However, this publication does not disclose a method of providing linearly polarized light of a direction varying according to the wavelength.

In a liquid crystal display device disclosed in the above-mentioned Japanese laid-open patent publication No. (Tokukaisho) 55-48733, it is necessary to provide a ¼ waveplate between the liquid crystal layer and the reflector. Therefore, it is difficult in theory to form a reflective film on the inner side of the liquid crystal cell. Thus, this liquid crystal display device is not suitable for a high resolution, high definition display.

Besides, in a reflective homogeneous structure as disclosed in the above-mentioned Japanese laid-open patent publication No. (Tokukaihei) 6-167708, coloration occurs because of the wavelength dispersion between the liquid crystal cell and optical phase difference compensation plate. In such a conventional structure, the dark state tends to color. Thus, there is a problem that a black-and-white display can not be achieved.

Similarly, in the homeotropic structure as disclosed in the above-mentioned Japanese laid-open patent publication No. (Tokukaihei) 6-337421 and Euro Display '96, p. 464, the liquid crystal is aligned parallel without being twisted during the application of a voltage. Hence, the dark state tends to color because of the effect of the wavelength dispersion between the liquid crystal cell and optical phase difference compensation plate. Consequently, there is a problem that a good black-and-white display cannot be achieved. Moreover, when the viewer sees the display in the absence of applied voltage from a directly front direction of the substrate (i.e., from a direction normal to the substrate), it is possible to achieve a good dark display because of zero retardation. However, when the viewer sees the display from a direction tilted from the direction normal to the substrate, retardation occurs. Therefore, the viewing angle characteristics related to the tilt angle of the display are very bad, and a good dark display is not achieved.

On the other hand, the structures as disclosed in Japanese laid-open patent publication No. (Tokukaihei) 2-236523 and Japan Display '89, p. 192 have higher reflectivity in the bright state compared with a structure using two polarizers. However, since the transmissivity in the dark state depends greatly on the wavelength, a good black display is not achieved. Additionally, Δnd that is the product of a difference of refractive indices (Δn) of the liquid crystal layer and a thickness (d) of the liquid crystal layer needs to have a very small value of around 200 nm. When Δnd has such a value, if a liquid crystal panel is fabricated using a general liquid crystal material, i.e., a liquid crystal material having Δn of 0.065 or more, the cell gap in the liquid crystal layer has a very small value of substantially 3 μm. Thus, it is difficult to manufacture the liquid crystal panel.

Furthermore, the structure disclosed in the above-mentioned Japanese laid-open patent publication No. (Tokukaihei) 8-62564 using a polarizing beam splitter and a birefringence element was designed to improve the contrast. However, since the brightness was not improved, the efficiency was not increased. Moreover, according to the descriptions in an embodiment disclosed in this publication, although the contrast was improved, the brightness was lowered and therefore the efficiency was rather worsened. According to an example described in the embodiment of this publication, in order to improve the projection efficiency, the liquid crystal alignment which is oriented homeotropically when a low voltage is applied is arranged to be a tilted alignment state by increasing the applied voltage so as to increase the brightness in this alignment state. However, in order to maintain the contrast, there is a requirement that an optical element used for this arrangement does not increase the brightness in the dark state. However, an optical element having such a function and the liquid crystal display device incorporating the optical element have never been disclosed.

DISCLOSURE OF THE INVENTION

In order to solve the above problems, i.e., the problems associated with a single polarizer liquid crystal display device capable of providing high resolution displays, or the problems associated with a reflected light projection type liquid crystal display device and head-mount display, objects of the present invention are to improve the function of a laminated phase plate, provide a laminated phase plate capable of achieving a reflective type liquid crystal display device with an excellent visibility or a projection-type liquid crystal display device with a high efficiency, and a liquid crystal display device incorporating the laminated phase plate.

In order to achieve the above objects, a laminated phase plate of the present invention is formed by laminating a first optical phase difference compensation plate and a second optical phase difference compensation plate. The first optical phase difference compensation plate has a retardation between 100 nm and 180 nm for transmitted light of a wavelength of 550 nm in a direction normal to the first optical phase difference compensation plate. The second optical phase difference compensation plate has a retardation between 200 nm and 360 nm for transmitted light of a wavelength of 550 nm in a direction normal to the second optical phase difference compensation plate. The first and second optical phase difference compensation plates are arranged so that, when linearly polarized light which is visible light and has a fixed plane of vibration is incident on the second optical phase difference compensation plate, the value of |θ1−2×θ2|, wherein θ1 is an angle between a direction perpendicular to the direction of vibration of the linearly polarized light or the direction of vibration of the linearly polarized light incident on the set off plates and a direction of a slow axis of the first optical phase difference compensation plate, and θ2 is an angle between the direction perpendicular to the direction of vibration of the linearly polarized light or the direction of vibration of the linearly polarized light incident on the set off plates and a direction of a slow axis of the second optical phase difference compensation plate, is within a range between 80 degrees and 100 degrees.

The above invention was implemented by finding that, in a combination of an optical phase difference compensation plate which produces a phase difference of a ½ wavelength and an optical phase difference compensation plate which produces a phase difference of a ¼ wavelength, it is important that the directions of the optical phase difference compensation plates are set to specific directions.

With the use of the laminated phase plate of the present invention, it is possible to achieve a liquid crystal display device in which a reflecting film formed surface of a reflector is located adjacent to a liquid crystal layer, and to provide a good dark state. Therefore, a reflective type liquid crystal display device capable of providing a high contrast, high definition display of a moving picture without parallax can be obtained. Moreover, if the laminated phase plate of the present invention is adopted into a liquid crystal display device for projecting reflected light or into a head-mount display, the projection efficiency can be improved.

In addition, in order to achieve the above object, a liquid crystal display device of the present invention includes a first substrate, a second substrate having light transmitting properties, a liquid crystal layer which is made of a liquid crystal compound containing liquid crystal and disposed between the first and second substrates, the laminated phase plate of claim 1 disposed on a display side of the second substrate, polarizing means, disposed on the second optical phase difference compensation plate side of the laminated phase plate, for causing linearly polarized light which is visible light and has a fixed plane of vibration to be incident on the second optical phase difference compensation plate, and light reflecting means, when the linearly polarized light which is visible light and has a fixed plane of vibration is caused to be incident on the second optical phase difference compensation plate by the polarizing means, for reflecting at least a part of the light which has transmitted through the second optical phase difference compensation plate, first optical phase difference compensation plate, second substrate and liquid crystal layer and gone out of the liquid crystal layer.

The above-mentioned invention was implemented by finding a structure of a liquid crystal display device which uses the laminated phase plate of the present invention most effectively for a display when the liquid crystal display device is constructed with the use of the laminated phase plate of the present invention.

The liquid crystal display device of the present invention achieves a reflective type liquid crystal display device with a high reflectivity and high contrast. Besides, the reflective film formed surface of the reflector can be located on the liquid crystal layer side of a transparent substrate, and thus a good dark state can be achieved. It is therefore possible to provide a high contrast, high definition display of a moving picture without parallax. Additionally, when a polarizing beam splitter is used for a liquid crystal display device having a layer of liquid crystal homeotropically aligned, an especially excellent contrast characteristic is obtained.

Moreover, when a color filter which has been adjusted for high brightness is used in a liquid crystal display device of the present invention, it is possible to achieve a reflective type color liquid crystal display device that provides high display quality with good color reproduction characteristics.

Furthermore, another invention is a liquid crystal display device (liquid crystal display device ①) which is based on the liquid crystal display device of the present invention, and in which the polarizing means is formed by a polarizer.

According to the liquid crystal display device ①, it is possible to achieve a direct viewing type liquid crystal display device which can most effectively use the laminated phase plate of the present invention. In other words, according to the liquid crystal display device ①, it is possible to provide a liquid crystal display device which achieves a good black display and good brightness with the laminated phase plate, and exhibits a good display characteristic that does not deteriorate the brightness.

Still another invention is a liquid crystal display device (liquid crystal display device ②) which is based on the liquid crystal display device of the present invention or the liquid crystal display device ①, and in which the liquid crystal compound has a positive dielectric anisotropy, the twist angle of the liquid crystal between the first and second substrates is between 60 degrees and 100 degrees, and the product of a difference of refractive indices of the liquid crystal of the liquid crystal layer and the thickness of the liquid crystal layer is between 150 nm and 330 nm.

According to the liquid crystal display device ②, it is possible to optimize the liquid crystal display device of the present invention or liquid crystal display device ①. In other words, according to the liquid crystal display device ②, it is possible to ensure sufficiently low reflectivity in a dark state for a visible wavelength range, and provide a liquid crystal display device which can be manufactured easily at a high yield.

Yet another invention is a liquid crystal display device ③ which is based on any one of the liquid crystal display device of the present invention and liquid crystal display devices ① and ②, and in which the light reflecting means is a light reflecting film which is made of a conductive material, placed on the liquid crystal layer side of the first substrate, and has a surface with smoothly and continuously changing undulations.

In the direct viewing type liquid crystal display device, when the bright state is a white state rather than a mirror reflection, it is necessary to perform a diffuse reflection. According to the liquid crystal display device of the present invention, especially a liquid crystal display device with excellent display quality can be realized by the use of a reflector having smooth undulations.

More specifically, the liquid crystal display device ③ was implemented by finding a structure of the light reflecting means, which is particularly suitable for the liquid crystal display device of the present invention. According to the liquid crystal display device ③, since the light reflecting film having undulations is provided, it is possible to prevent the reflection by the light reflecting means from becoming a mirror reflection. Consequently, it is possible to prevent the image in the surroundings of the device, such as the face of the viewer, from being reflected in the display surface of the liquid crystal display device, thereby realizing an excellent white display. Moreover, since no element having a scattering effect is disposed in front of the liquid crystal display device, it is possible to achieve an excellent black display. Accordingly, a liquid crystal display device with a high contrast ratio can be realized.

Besides, according to the liquid crystal display device ③, since the light reflecting film is formed by a conductive material, it also performs a function of an electrode for applying a voltage to the liquid crystal layer with a transparent electrode formed on the second substrate.

In order to achieve the liquid crystal display device ③, a plurality of protruding portions are formed on the liquid crystal layer side of the first substrate so that undulations are formed by the protruding portions and the first substrate, a planerization film for smoothing the surface of the undulations is formed on the protruding portions, and the light reflecting film is formed on the planerization film.

Yet another invention is a liquid crustal display device (liquid crystal display device ④) which is based on the liquid crystal display device ③, and in which a surface having the undulations of the light reflecting film has anisotropic properties that depend on the direction in the plane of the first substrate.

According to the liquid crystal display device ④, it is possible to further improve the reflection brightness of the reflecting type liquid crystal display device.

The liquid crystal display device ④ can be realized by changing the average interval of the undulations of the undulating surface of the light reflecting film according to the direction in the plane of the first substrate.

More specifically, the liquid crystal display device ④ includes a plurality of protruding portions and a planerization film between the light reflecting film and the first substrate as described above, and the protruding portions when seen from a direction normal to the first substrate have elliptical shapes whose longer axes are oriented in the same direction.

Still another invention is a liquid crystal display device (liquid crystal display device ⑤) which is based on any one of the liquid crystal display device of the present invention and liquid crystal display devices ① to ④, and in which the liquid crystal layer has a liquid crystal whose alignment direction varies according to an applied voltage, and dispersed polymer which has optical anisotropy and an alignment direction that does not vary according to the applied voltage.

In the liquid crystal display device ⑤, the liquid crystal and polymer are dispersed in the layer of the aligned liquid crystal, and the polymer has an alignment direction similar to that of liquid crystal molecules in the absence of applied voltage and optical anisotropy by itself. Accordingly, in the absence of applied voltage, the refractive index of the liquid crystal compound and that of the polymer are the same, and thus scattering does not occur. On the other hand, when a voltage is applied, the refractive index of the liquid crystal compound and that of the polymer differ from each other, and scattering occurs. Therefore, even with the use of a reflective film exhibiting a mirror surface, it is possible to provide a white display without mirror reflection in a direction other than the specular reflection, thereby achieving an extremely high contrast ratio.

In addition, still another invention is a liquid crystal display device (liquid crystal display device ⑥) which is based on the liquid crystal display device of the present invention, and in which the polarizing means is formed by a polarizing beam splitter.

The liquid crystal display device ⑥ was implemented by finding that when a polarizing beam splitter was used as the polarizing means in a projection type or head-mount type liquid crystal display device with reflected light, the brightness in the dark state was not increased with the use of the optical phase difference compensation plate of the present invention.

According to the liquid crystal display device ⑥, it is possible to realize a projection type or head-mount type liquid crystal display device that maintains a high contrast ratio.

Furthermore, yet another invention is a liquid crystal display device (liquid crystal display device ⑦) which is based on the liquid crystal display device ⑥, and in which the liquid crystal compound has a positive dielectric anisotropy, the twist angle of the liquid crystal between the first and second substrates is within a range of from 60 degrees to 100 degrees, and the product of the difference of refractive indices of the liquid crystal and the thickness of the liquid crystal is between 150 nm and 330 nm.

In the liquid crystal display device of the present invention, the alignment direction of the liquid crystal layer needs to efficiently orient the linearly polarized light whose plane of vibration varies according to a wavelength, produced by the laminated phase plate of the present invention, in a transmitting direction of the polarizing beam splitter.

The liquid crystal display device ⑦ includes the liquid crystal layer which is capable of increasing the efficiency when the polarizing beam splitter is used and optimized so as to provide a structure satisfying the above-mentioned condition.

Additionally, yet another invention is a liquid crystal display device (liquid crystal display device ⑧) which is based on the liquid crystal display device ⑥, and in which the liquid crystal compound has a negative dielectric anisotropy, and the liquid crystal of the liquid crystal layer is aligned in a direction perpendicular to the first and second substrates in the absence of applied voltage.

According to the liquid crystal display device ⑧, it is possible to provide a display in a normally white mode and achieve a bright display.

Furthermore, yet another invention is a liquid crystal display device (liquid crystal display device ⑨) which is based on the liquid crystal display device ⑧, and in which, when the natural pitch of the liquid crystal is denoted by p and the liquid crystal layer thickness is denoted by d, the value of $|d/p|$ is larger than 0 but smaller than 0.5 and the product of the birefringence of the liquid crystal of the liquid crystal layer and the thickness of the liquid crystal layer is between 200 nm and 500 nm.

As a different structure from the liquid crystal display device ⑦, the liquid crystal display device ⑨ is constructed to have the liquid crystal layer which is capable of increasing the efficiency when the polarizing beam splitter is used and optimized by the liquid crystal alignment of the liquid crystal display device of the present invention.

For a fuller understanding of the nature and advantages of the invention, reference should be made to the ensuing detailed description taken in conjunction with the accompanying drawings.

BRIEF DESCRIPTION OF THE DRAWINGS

FIGS. 2(a) through 2(c) are views showing changes of vibrating electric field vector of light, which has passed through a second optical phase difference compensation plate of the first embodiment, with an evolution of time, wherein FIG. 2(a) shows a change of the point of the electric field vector with time when the incident light is light with a wavelength longer than a wavelength satisfying a ½ wavelength condition, FIG. 2(b) shows a change of the point of the electric field vector with time when the incident light is light with a wavelength satisfying the ½ wavelength condition, and FIG. 2(c) shows a change of the point of the electric field vector with time when the incident light is light with a wavelength shorter than a wavelength satisfying the ½ wavelength condition.

FIGS. 3(a) through 3(c) are views showing changes of vibration electric field vector of light, which has passed through a first optical phase difference compensation plate of the first embodiment, with an evolution of time, wherein FIG. 3(a) shows a change of the point of the electric field vector with time when the incident light is light with a wavelength longer than a wavelength satisfying a ¼ wavelength condition, FIG. 3(b) shows a change of the point of the electric field vector with time when the incident light is light with a wavelength satisfying the ¼ wavelength condition, and FIG. 3(c) shows a change of the point of the electric field vector with time when the incident light is light with a wavelength shorter than a wavelength satisfying the ¼ wavelength condition.

FIGS. 6(a) through 6(d) are views showing changes of vibration electric field vector of light, which has passed through the laminated phase plate (optical phase difference compensation plates) of Example 1, with time, wherein FIG. 6(a) shows a change of Sample 1a with time, FIG. 6(b) shows a change of Sample 1b with time, FIG. 6(c) shows a change of Sample 1c with time, and FIG. 6(d) shows a change of Comparative Example 1 with time.

FIGS. 21(a) and 21(b) are plan views showing arrangements of optical elements of a liquid crystal display device, wherein FIG. 21(a) shows an arrangement according to Example 3 and FIG. 21(b) shows an arrangement according to Comparative Example 3.

BEST MODE FOR IMPLEMENTING THE INVENTION

The following descriptions will explain the best mode for implementing the present invention with reference to the drawings.

[Embodiment 1]

Figure 1:
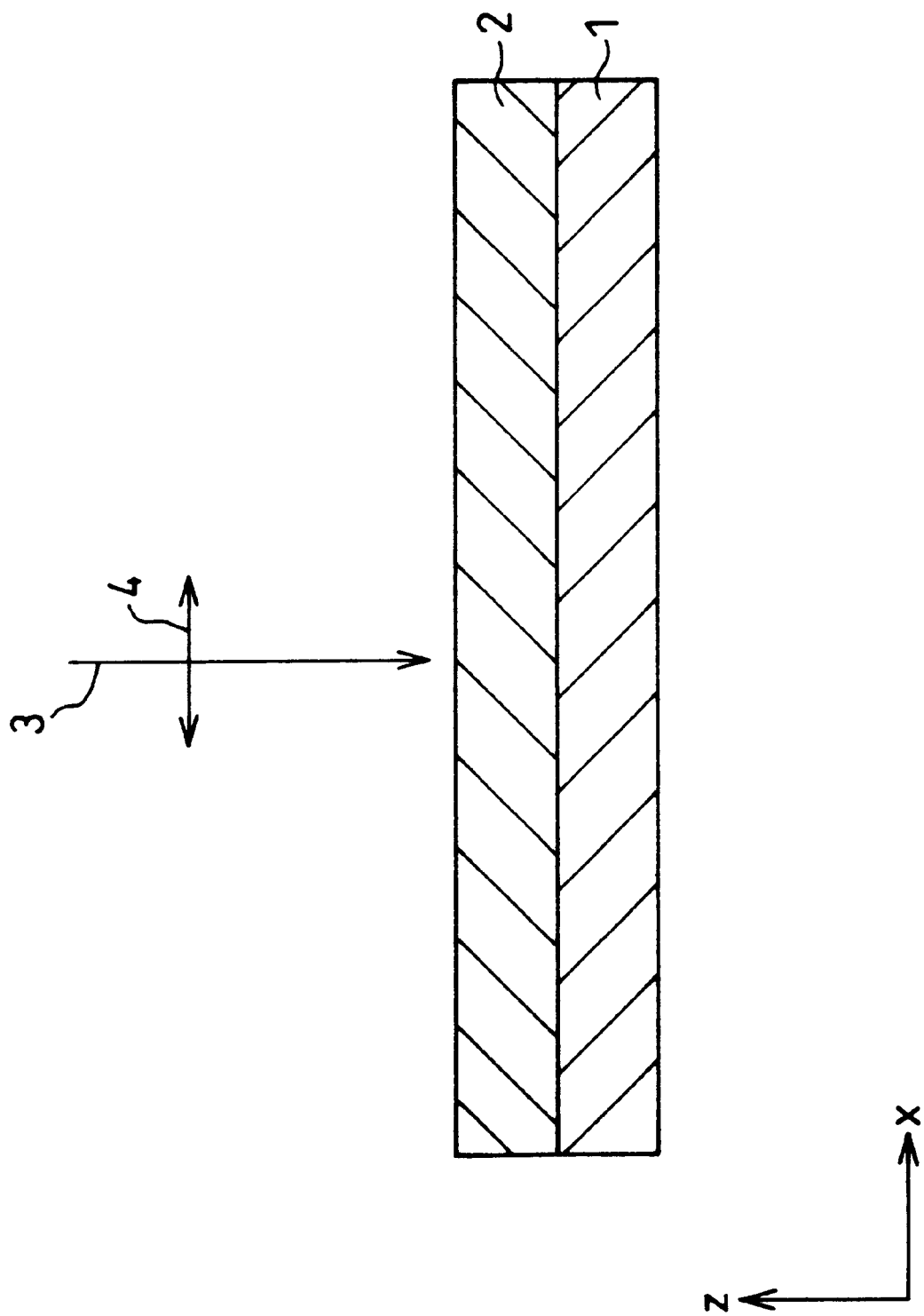
FIG. 1 is a cross sectional view of an essential section, showing a schematic structure of a laminated phase plate according to a first embodiment of the present invention.

FIG. 1 is a cross sectional view of an essential section showing a schematic structure of a laminated phase plate according to one embodiment of the present invention. As illustrated in FIG. 1, this laminated phase plate is composed of a first optical phase difference compensation plate 1 and a second optical phase difference compensation plate 2. Incident light 3 on the second phase difference compensation plate 2 is made linearly polarized light by polarizing means such as a polarizer and a polarizing beam splitter though the means is not particularly restricted. FIG. 1 uses an xyz rectangular coordinate system in which the x direction is the vibration direction 4 of an electric field of the incident light 3 as linearly polarized light, the −z direction is the travel direction of the incident light 3, and the xy plane (not shown) is parallel to a plane on which the laminated phase plate is placed.

Figure 2:
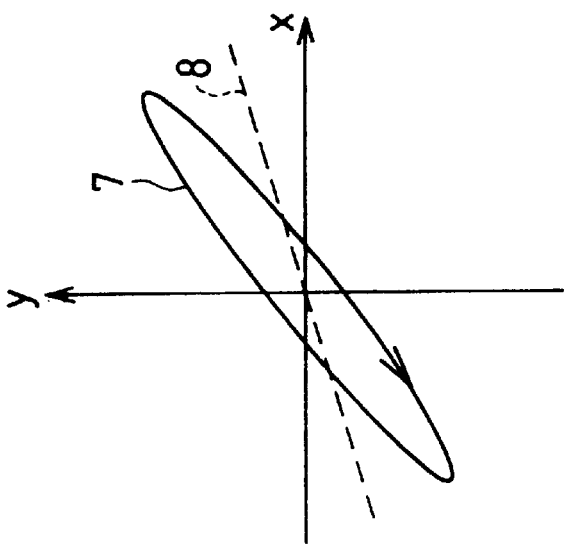
Figure 2:
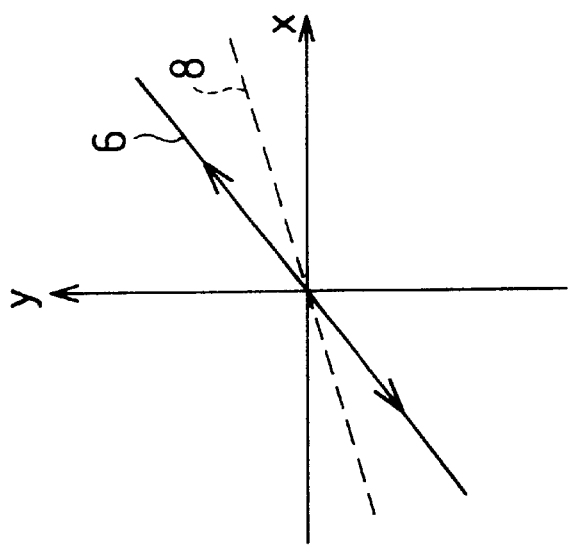
Figure 2:
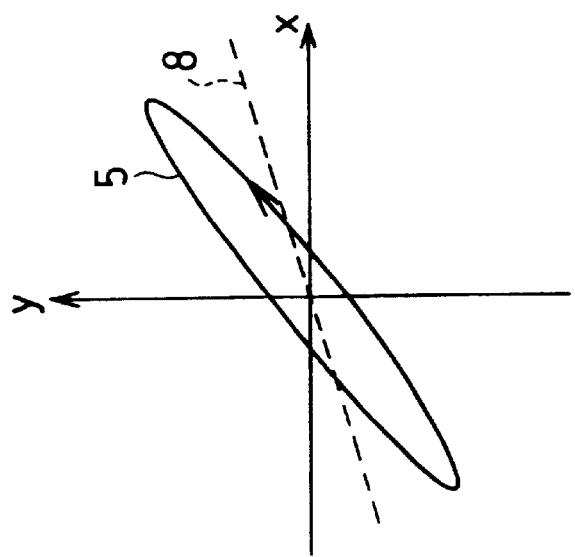

Next, the function of the laminated phase plate will be explained. The polarization state of the incident light 3 prepared for linear polarization was changed by the optical phase difference compensation plate 2. FIGS. 2(a), 2(b) and 2(c) show changes 5, 6 and 7 of the point of the electric field vector with time when the incident light 3 whose electric field vector was changed by the optical phase difference compensation plate 2, with respect to a slow axis direction 8 of the optical phase difference compensation plate 2.

FIG. 2(a) shows the change 5 of the point of the electric field vector with time when the incident light 3 (see FIG. 1) had a wavelength longer than a wavelength satisfying a ½ wavelength condition. FIG. 2(b) shows the change 6 of the point of the electric field vector with time when the incident light 3 had a wavelength satisfying the ½ wavelength condition. FIG. 2(c) shows the change 7 of the point of the electric field vector with time when the incident light 3 had a wavelength shorter than a wavelength satisfying the ½ wavelength condition. Moreover, in FIGS. 2(a) to 2(c), the xyz rectangular coordinate system shown in FIG. 1 was used.

Since the optical phase difference compensation plate 2 has a birefringence that produces a phase difference of $\pi$ for a single wavelength within a range of from 400 nm to 700 nm as a visible wavelength range, it changes the incident light 3 into different polarization states according to the wavelengths as shown in FIGS. 2(a) to 2(c). More specifically, the optical phase difference compensation plate 2 having a slow axis direction indicated by 8 changes the phase of the incident light 3 vibrating in the x direction (the direction of vibration of the electric field shown in FIG. 1), thereby changing the polarization state of the incident light 3. As a result, the rotating direction of the optical electric field is reversed (FIGS. 2(a) and 2(c)) at a wavelength (FIG. 2(b)) satisfying the ½ wavelength condition as a border.

Figure 3:
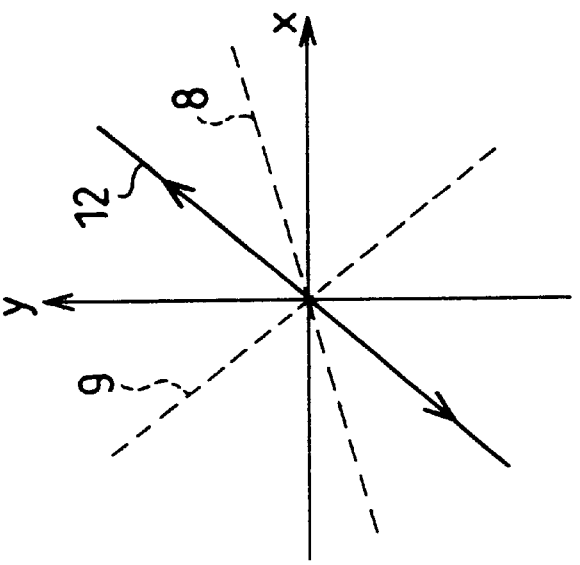
Figure 3:
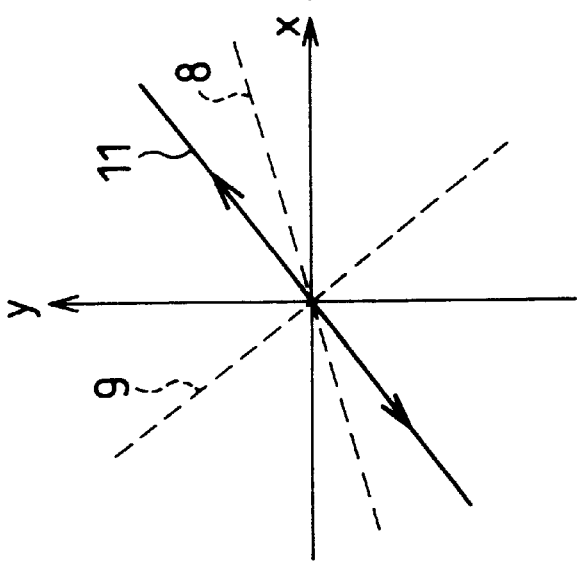
Figure 3:
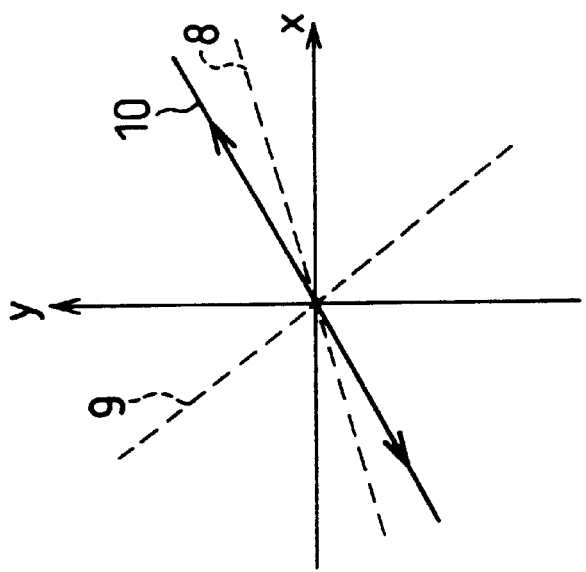

Furthermore, the incident light in such a polarization state is caused to be incident on the optical phase difference compensation plate 1. The changes in the polarization state at that time are shown in FIGS. 3(a), 3(b) and 3(c) as changes 10, 11 and 12 of a locus of the electric field vector of the incident light whose polarization state is changed with time with respect to a slow axis direction 9 of the optical phase difference compensation plate 1. Specifically, FIG. 3(a) shows the change 10 of the locus of the electric field vector with time when the incident light is longer than a wavelength satisfying a ¼ wavelength condition. FIG. 3(b) shows the change 11 of the locus of the electric field vector with time when the incident light has a wavelength satisfying the ¼ wavelength condition. FIG. 3(c) shows the change 12 of the locus of the electric field vector with time when the incident light is shorter than a wavelength satisfying the ¼ wavelength condition.

The optical phase difference compensation plate 1 has a retardation that produces a phase difference of ¼ wavelength for light of a single wavelength within a range of from 400 nm to 700 nm. Therefore, the optical phase difference compensation plate 1 further changes the polarization state so that the incident light is changed into different polarization states according to the wavelengths as shown in FIGS. 3(a) to 3(c). More specifically, the polarization state of the light of each wavelength incident on the optical phase difference compensation plate 1 becomes linear polarization when the light passes through the optical phase difference compensation plate 1, but the azimuth angle of the plane of vibration varies depending on the wavelength. Thus, by reflecting the light in this state by a reflector and propagating the light to the optical phase difference compensation plate 1 and optical phase difference compensation plate 2 in this order that is reverse to the order in the incidence, the same linearly polarized light as the polarized light prepared in advance can be achieved.

The following descriptions will further explain the effect of this laminated phase plate. In an example explained here, a polarizer is used for the preparation of the polarization state of the incident light 3 shown in FIG. 1 (the direction of vibration of the electric field shown in FIG. 1), and this polarization state is used for a bright state of a reflective display of a liquid crystal display device. In this case, although the optical phase difference compensation plates 1 and 2 are used, components of light which are to be absorbed by the polarizer when the light is outgoing are not produced. In addition, since the polarizing direction varies according to the wavelength of light, an optical compensating function is performed. In other words, a phase difference compensating function is performed without deteriorating the brightness.

Furthermore, as another example, a polarizing beam splitter may be used to linearly polarize the incident light instead of the above-mentioned polarizer, and the reflected light may be caused to be incident on the polarizing beam splitter in the reversed optical path. In this case, when the light is outgoing, the component of the light which is polarized in the same direction as incident light 4 on the optical phase difference compensation plate 2 can not pass through the polarizing beam splitter and travels in the direction of the incident light. Therefore, for a display device for displaying light passed through the polarizing beam splitter when the light is outgoing, it is possible to achieve the optical phase difference compensation plates 1 and 2 which do not increase the brightness in a dark state though they perform the optical compensating functions.

The following descriptions will explain an example as one example of this embodiment in great detail, but the scope of the present invention is not limited to such an example.

EXAMPLE 1

The following descriptions will explain an example of a laminated phase plate according to Embodiment 1 as Example 1.

Figure 4:
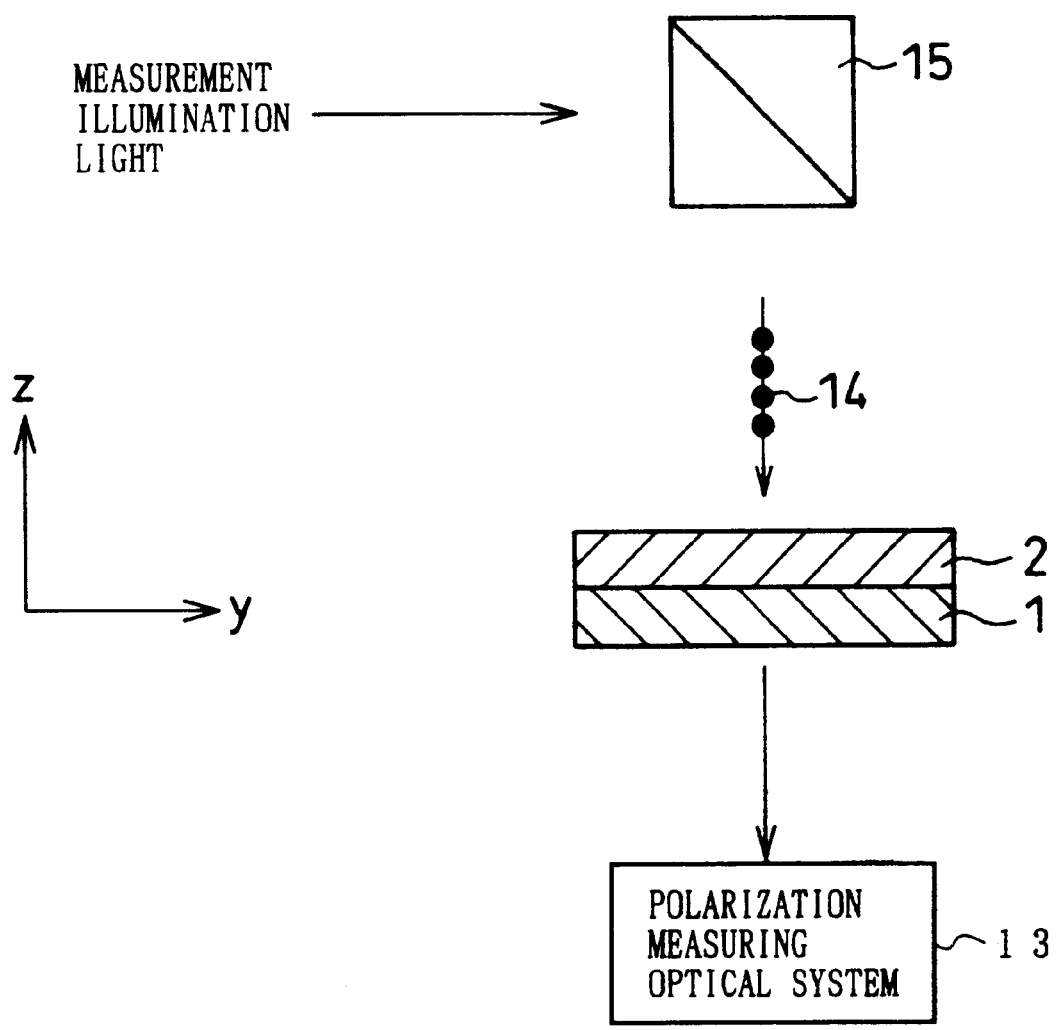
FIG. 4 is a view showing a measurement arrangement for a polarization state which was varied by the optical phase difference compensation plates of Example 1.

FIG. 4 is a schematic view of an optical system used in this example for examining the change in linearly polarized light produced by the laminated phase plate of Embodiment 1. In this example, as illustrated in FIG. 4, measurement illumination light was incident on a polarizing beam splitter 15, and a linearly polarized light as s-polarized light prepared by the polarizing beam splitter 15 was incident on the optical phase difference compensation plate 2 and optical phase difference compensation plate 1. The polarization state was measured at a position indicated by numeral 13 in FIG. 4. In the xyz rectangular coordinate system shown in FIG. 8, the y direction is the direction in planes of the optical phase difference compensation plates 1 and 2 (laminated phase plate) and the x direction is the direction of vibration of linearly polarized light 14.

In this example, one optical phase difference compensation plate having a retardation between 130 nm and 140 nm for light having a wavelength of 550 nm was used as the optical phase difference compensation plate 1, and one optical phase difference compensation plate having a retardation between 265 nm and 275 nm for light having a wavelength of 550 nm was used as the optical phase difference compensation plate 2. These optical phase difference compensation plates were adhered to each other. Moreover, each of the optical phase difference compensation plates 1 and 2 used in this example was a film which was an oriented film made of polycarbonate and had an adhesive layer on a surface thereof.

Figure 5:
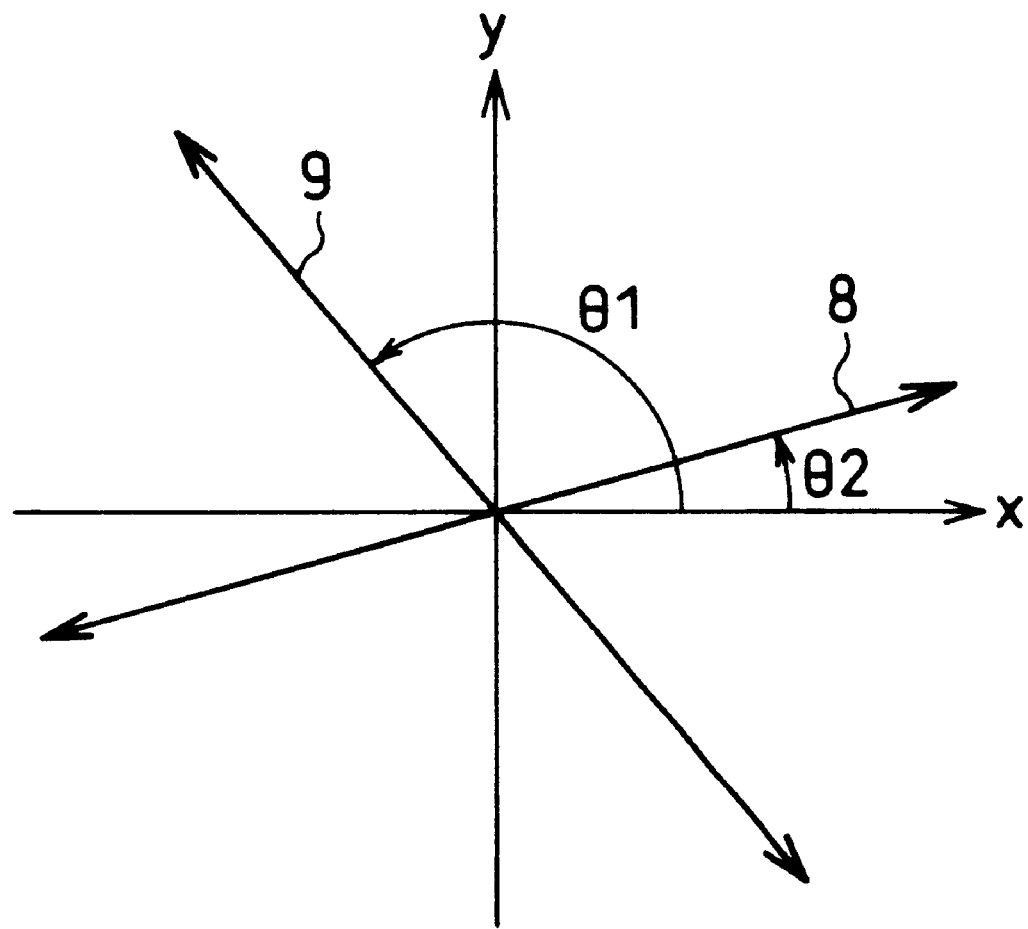
FIG. 5 is a view showing the angle of setting an installation direction of a laminated phase plate (optical phase difference compensation plates) and a polarizer of Example 1.

Here, setting of the directions of the slow axes of the optical phase difference compensation plates 1 and 2 will be explained. Specifically, the following descriptions will explain an arrangement shown in FIG. 5, $\theta 1$ is an angle formed by the x direction as the direction of vibration of linearly polarized light (or a direction perpendicular to the direction of vibration of the linearly polarized light) and a slow axis direction 9 of the optical phase difference compensation plate 1, and $\theta 2$ is an angle formed by the x direction as the direction of vibration of linearly polarized light (or a direction perpendicular to the direction of vibration of the linearly polarized light) and a slow axis direction 8 of the optical phase difference compensation plate 2. Note that FIG. 5 shows the arrangement observed from the direction of incident light on a liquid crystal display device (the +z direction).

In this example, three samples were prepared so that the angles $\theta 1$ and $\theta 2$ shown in FIG. 5 had the values indicated in Table 1 below.

TABLE 1

|  | $\theta 1$ | $\theta 2$ |
|---|---|---|
| Sample 1a | 110 degrees | 10 degrees |
| Sample 1b | 120 degrees | 15 degrees |
| Sample 1c | 130 degrees | 20 degrees |
| Comparative Example 1 | 67.5 degrees | 22.5 degrees |

More specifically, three kinds of samples 1a, 1b, 1c of laminated phase plates were fabricated such that Sample 1a had $\theta 1=110°$ and $\theta 2=10°$, Sample 1b had $\theta 1=120°$ and $\theta 2=15°$, and Sample 1c had $\theta 1=130°$ and $\theta 2=20°$.

For comparison purposes, a ½ waveplate with a wider wavelength range was fabricated as Comparative Example 1. This ½ waveplate was fabricated with the use of an optical phase difference compensation plate having a retardation between 265 nm and 275 nm like the optical phase difference compensation plate 2, instead of the optical phase difference compensation plate 1. The ½ waveplate was arranged so that $\theta 2=22.5°$ when $\theta 1=67.5°$ in FIG. 5. Comparative Example 1 used a ½ waveplate of a wider range, composed of two pieces of ½ waveplates described in Japanese laid-open patent publication No. (Tokukaihei) 5-100114 mentioned above as a prior art.

Figure 6:
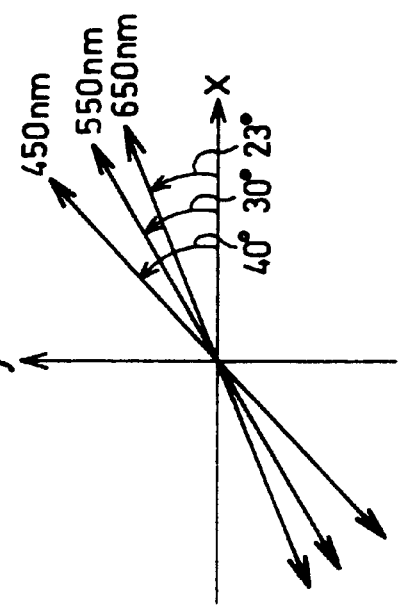
Figure 6:
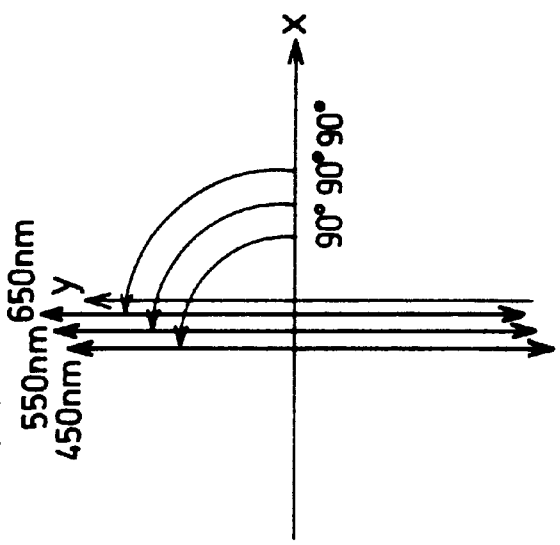
Figure 6:
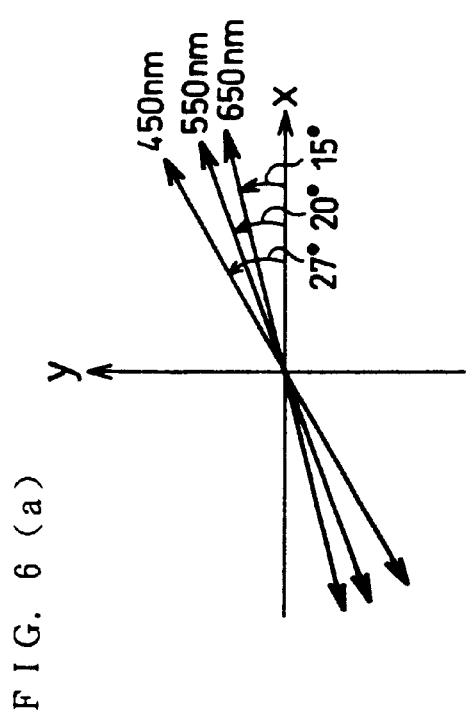
Figure 6:
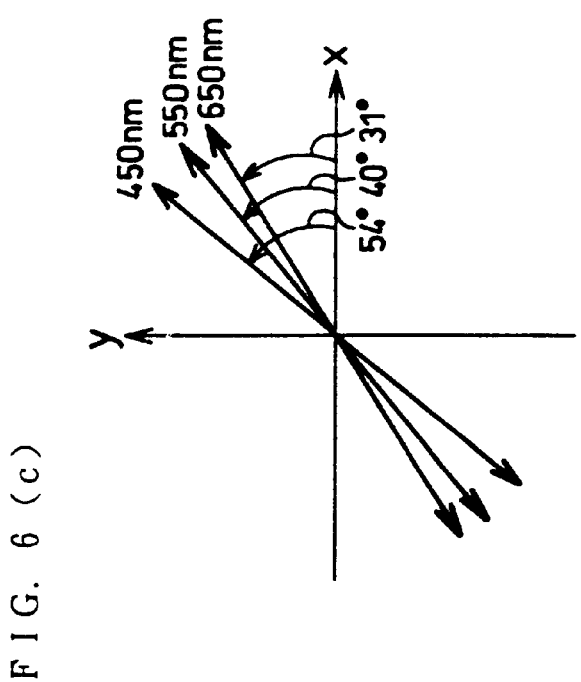

The results of measuring the polarization states of Example 1 and Comparative Example 1 are shown in FIGS. 6(a) to 6(d). Specifically, FIG. 6a indicates the measurement results of Sample 1a, FIG. 6b is the measurement results of Sample 1b, FIG. 6c is the measurement results of Sample 1c, and FIG. 6d is the measurement results of Comparative Example 1. Additionally, in FIGS. 6(a) to 6(d), the x axis shows the direction of vibration of linearly polarized light before incident on the optical phase difference compensation plates 1 and 2, and the arrows indicate the directions in the planes of vibration of linearly polarized lights passed through the optical phase compensation plates 1 and 2.

It was found from FIGS. 6(a) to 6(d) that all of Samples 1a, 1b, 1c had different vibration plane directions for wavelengths of 450 nm, 550 nm, and 650 nm, and achieved excellent linear polarization states.

However, in Comparative Example 1, although a substantially linearly polarized light was achieved for these wavelengths, the plane of vibration is uniform for these wavelengths. Therefore, similarly to normal linearly polarized light, it is impossible to expect the phase compensating effect for the light transmitted in a direction normal to the optical phase difference compensation plates.

Figure 7:
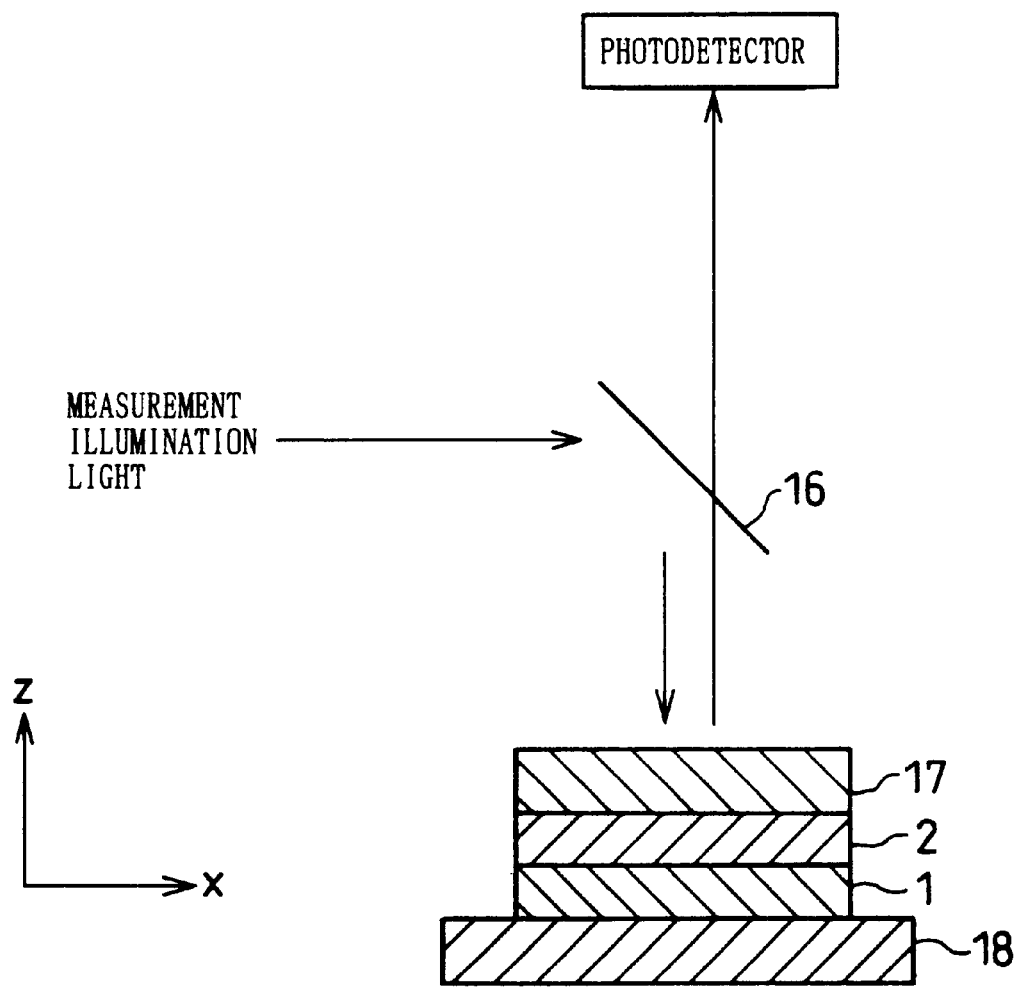
FIG. 7 is a conceptual view of an arrangement of a measurement optical system used for measuring the reflectivity of Example 1.

In order to evaluate the degree of linearity of the linearly polarized lights obtained by Samples 1a, 1b and 1c, the reflectivity was measured with an optical system having an optical arrangement shown in FIG. 7. As illustrated in FIG. 7, in this optical system for measurements, a polarizer 17 was positioned above the optical difference compensation plate 2 of the laminated phase plate having the optical arrangement shown in Table 1 so as to generate the same linearly polarized light as that shown in FIG. 4 (the linearly polarized light whose direction of vibration is the x direction). Additionally, a reflector 18 formed by depositing aluminum by evaporation was attached to the lower surface of the optical phase difference compensation plate 1 so that the aluminum deposited surface served as a reflecting surface. Moreover, it was arranged such that a measurement illumination light was reflected by a half mirror 16 and incident on the polarizer 17, and the light reflected from a sample to be measured passed through the half mirror 16 and reached a photodetector.

The results of measuring the reflectivity are shown in Table 2 below.

TABLE 2

|  | 450 nm | 550 nm | 650 nm |
|---|---|---|---|
| Sample 1a | 99.6% | 99.9% | 99.6% |
| Sample 1b | 99.5% | 99.9% | 99.5% |
| Sample 1c | 99.3% | 99.9% | 99.3% |

Here, the reflectivity is indicated on the basis that the reflectivity of a sample having the reflector 18 which was attached directly to the polarizer 17 without using the optical phase difference compensation plates 1 and 2 is 100%.

It can be understood from Table 2 that a very high, excellent reflectivity of more than 99% was obtained for each of Samples 1a, 1b, 1c.

As described above, when the incident light was transmitted through the optical phase difference compensation plate 2 and optical phase difference compensation plate 1, a state in which the plane of vibration of the light varied according to the wavelengths was achieved. It was confirmed for each wavelength that the light was good linearly polarized light which did not deteriorate the reflectivity due to going to and fro of light by a combination with the polarizer 17.

Figure 8:
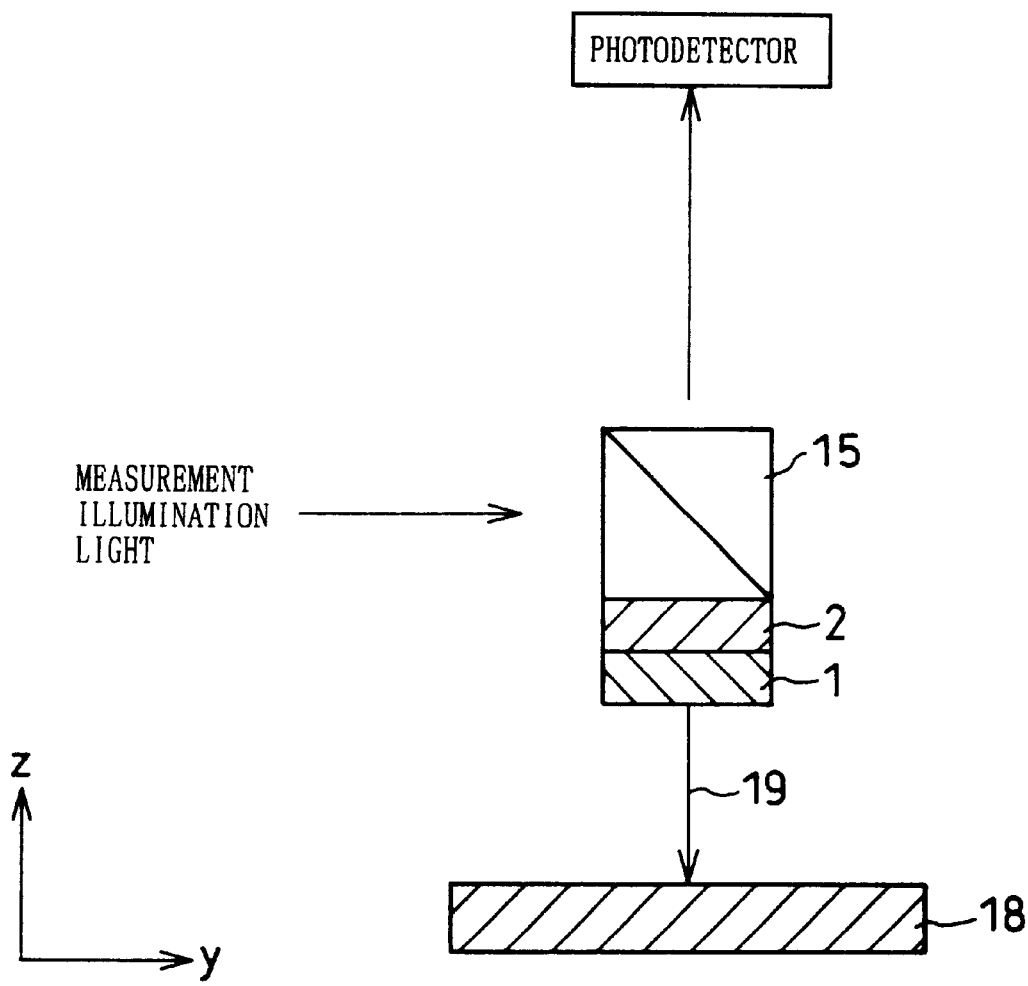
FIG. 8 is a conceptual view of an arrangement of a measurement optical system used for measuring a component perpendicular to linearly polarized light of incident light of Example 1.

Moreover, as shown in FIG. 8, the optical phase difference compensation plates 1, 2 whose optical arrangements were the same as Samples 1a, 1b, 1c were attached to the polarizing beam splitter 15. Linearly polarized light was incident on the optical phase difference compensation plates 1, 2, and the intensity (Y value) of a linearly polarized component perpendicular to the polarizing direction of the incident light was observed. At this time, the reflector 18 was placed with a space between the optical phase difference compensation plate 1 and the reflector 18. It was found as a result of the measurement that, when the intensity at a position indicated by numeral 19 was 100%, all the samples having the same optical arrangements as Samples 1a, 1b, 1c showed good small values of not more than 0.5%. Consequently, it was confirmed that the laminated phase plate (optical phase difference compensation plates 1 and 2) of the present invention were effective for a reflective type liquid crystal display device using the polarizing beam splitter 15.

[Embodiment 2]

The following descriptions will explain another embodiment of a liquid crystal display device of the present invention as Embodiment 2.

Another embodiment of a liquid crystal display device of the present invention is a reflective type liquid crystal display device which causes illumination light such as external light to be incident on a liquid crystal layer through a polarizer and two pieces of optical phase difference compensation plates, and is observed from the incident side of the illumination light.

First, the embodiment using the polarizer will be explained.

Figure 9:
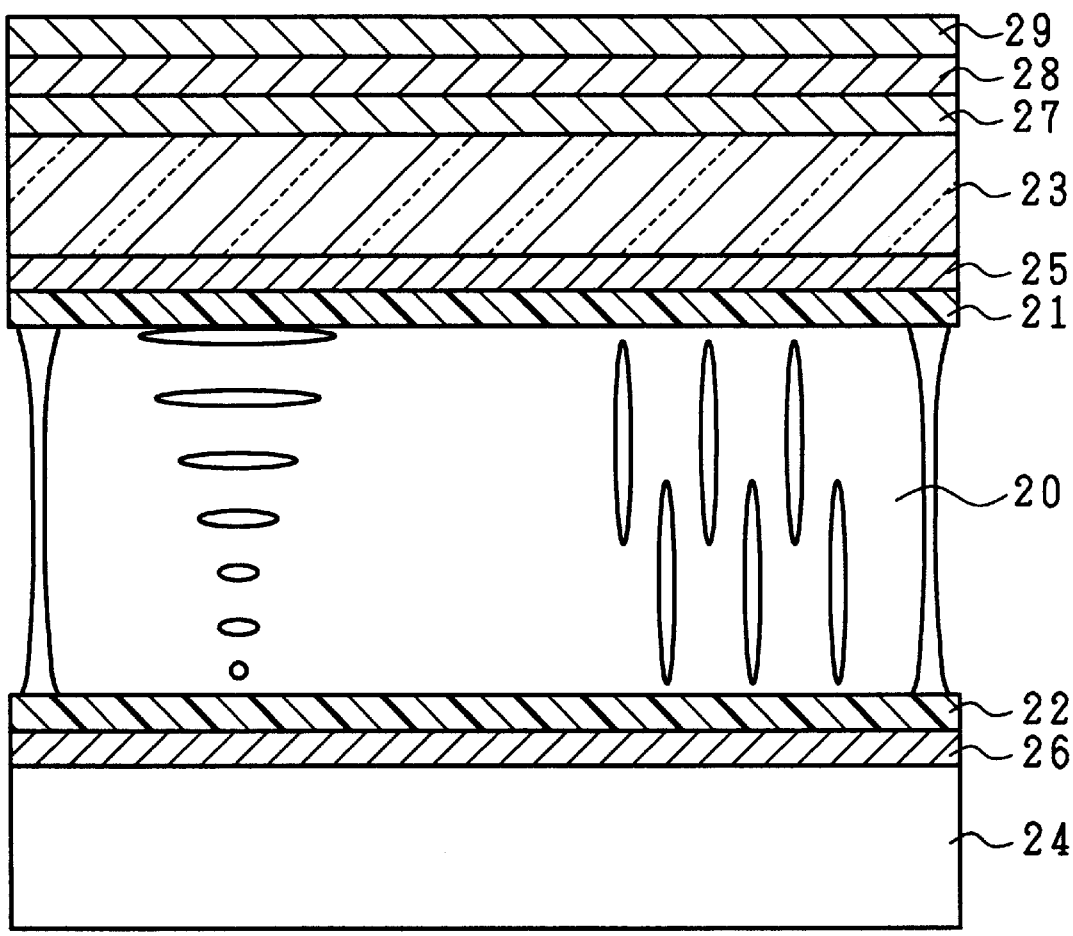
FIG. 9 is a cross sectional view of an essential section showing a schematic structure of a liquid crystal display device according to a second embodiment.

FIG. 9 shows a schematic structure of a direct viewing reflective type liquid crystal display device of the present invention using a laminated phase plate of the present invention. As illustrated in FIG. 9, a liquid crystal layer 20 is sandwiched between a substrate 23 having thereon an alignment film 21 which underwent an alignment treatment and a substrate 24 having thereon an alignment film 22 which underwent the same alignment treatment. Electrodes 25 and 26 for applying a voltage to the liquid crystal layer 20 are formed on the liquid crystal layer 20 sides of the substrates 23 and 24, respectively.

When the linearly polarized light of fixed plane of vibration over a visible range prepared by the polarizer 29 (described later) passes through the optical phase difference compensation plates 27 and 28, substrate 23 and liquid crystal layer 20, at least a part of the light will be reflected by a reflector or reflecting film. The liquid crystal display device above mentioned includes such light reflecting means.

The electrode 26 may be a light reflecting film which is made of a conducting material and also performs the function of the above-mentioned reflector (light reflecting means). In the following descriptions, the electrode 26 performing the function of the reflector will be referred to as the reflective electrode 26.

Moreover, the reflective electrode 26 may have smooth undulations such that the polarizing property of the reflected light is preserved. The smooth undulations may have anisotropy depending on the direction in the plane of the reflective electrode 26, and, for example, the interval of the undulations may vary according to a direction on the reflective electrode 26.

Furthermore, an active switching element may be used as voltage applying means to the electrodes 25 and 26 having such structures. However, it is not necessary to limit the voltage applying means to the active switching element.

The laminated phase plate composed of the optical phase difference compensation plates 27 and 28 is disposed on the viewer side (display side) of the substrate 23 of a liquid crystal cell thus fabricated, on which side the liquid crystal layer 20 is not placed. Note that this laminated phase plate is the same as the one explained in above-described Embodiment 1 with reference to FIGS. 1 to 3.

Additionally, provided on the optical phase difference compensation plate 28 side of the laminated phase plate is a polarizer (polarizing means) 29 which causes linearly polarized light that is visible light and has a fixed plane of vibration to be incident on the optical phase difference compensation plate 28.

The following descriptions will explain the functions of the respective optical elements (optical phase difference compensation plates 27 and 28, and the polarizer 29).

In the structure shown in FIG. 9, when the incident light impinges on the polarizer 29, only the linearly polarized component of a specific direction is selectively transmitted by the polarizer 29. Then, the polarization state of the incident linearly polarized light is changed as mentioned above by the optical phase difference compensation plates 28 and 27. In other words, after the passage through the optical phase difference compensation plate 27, the incident light becomes linearly polarized light whose polarizing direction varies according to the wavelength.

More specifically, the direction of polarization depends on the arrangement of the three optical elements (optical phase difference compensation plates 27, 28 and the polarizer 29) as described in Embodiment 1. When the optical elements are positioned such that $\theta1=120°$ and $\theta2=15°$ in the above-mentioned arrangement of FIG. 5 (where $\theta1$ is the angle between the x direction and the slow axis direction 9 of the optical phase difference compensation plate 27 and $\theta2$ is the angle between the x direction and the slow axis direction 8 of the optical phase difference compensation plate 28), the following results are given.

The light incident on the liquid crystal display device passes through the polarizer 29 and the laminated phase plate (optical phase compensation plates 27 and 28), and becomes linearly polarized light whose polarizing direction varies according to the wavelength as shown in FIG. 6(b). Specifically, the angle formed by the linearly polarized light passed through the laminated phase plate and the linearly polarized light just after emitted from the polarizer 29 is 40 degrees for linearly polarized light of a wavelength of 450 nm, 30 degrees for linearly polarized light of a wavelength of 550 nm, and 23 degrees for linearly polarized light of a wavelength of 650 nm.

Thereafter, the polarization state of the light incident on the liquid crystal layer 20 is changed according to the birefringence of the liquid crystal layer 20 aligned in accordance with an applied voltage, and the light reaches the reflector (reflective electrode 26). Thus, the polarization state on the reflector (reflective electrode 26) varies according to the liquid crystal alignment.

Next, the operations in the bright and dark states will be explained.

First, the function of the bright state will be explained. According to the above-mentioned structure, in the case of the liquid crystal layer 20 in which the liquid crystal is aligned according to the applied voltage and does not have birefringence for light traveling in a direction normal to the liquid crystal display device (a direction normal to the substrates 23 and 24), the linearly polarized incident light reaches the reflector (reflective electrode 26) without changing its polarization.

In this case, since the incident light which becomes the linearly polarized light of a direction varying according to the wavelength remains in the state of the linearly polarized light on the reflector (reflective electrode 26), it is possible to realize a bright state. For the bright state, since the optical electric field of the linearly polarized light can have any direction in the plane of the reflector (reflective electrode 26), although the direction varies according to the wavelength, the reflectivity does not vary according to the wavelength.

A white display can be realized by achieving this bright state in a sufficiently wide visible wavelength range. In order to prepare a polarization state close to the above-mentioned state in a substantially visible wavelength range, the present inventors found that the following conditions (1) to (3) must be satisfied.

Specifically, condition (1) is that the optical phase difference compensation plate 27 must have a phase difference capable of giving a phase difference of ¼ wavelength for light of a principal visible wavelength between 400 nm and 700 nm, i.e., must have a retardation between 100 nm and 180 nm, condition (2) is that the optical phase difference compensation plate 28 must have a phase difference capable of giving a phase difference of ½ wavelength for light of a principal visible wavelength between 400 nm and 700 nm, i.e., must have a retardation between 200 nm and 360 nm, and condition (3) is that the values $\theta1$ and $\theta2$ relating to the arrangement of the polarizer 29 and optical phase difference compensation plates 27 and 28 shown in FIG. 5 must satisfy relation (1)

$$80° \leq |\theta1 - 2\times\theta2| \leq 100° \tag{1}$$

Needless to say that the values $\theta1$ and $\theta2$ can be varied within a range satisfying this relation. However, it is preferred that the specific values are determined according to a polarization state necessary for the dark state. Moreover, according to angle setting satisfying relation (1), the range of value of $|\theta1-2\times\theta2|$ is 20 degrees. Selecting a value within this range also depends on the value of birefringence of the liquid crystal layer 20 when a voltage is applied to the liquid crystal layer 20. In other words, it is preferred to set the birefringences of the optical phase difference compensation plates 27, 28 and the liquid crystal layer 20 such that the linearly polarized light is produced on the reflector (reflective electrode 26).

Next, the function in the dark state will be explained. The dark state can be realized by converting the incident light which is made linearly polarized light having a direction varying according to the wavelength by the optical phase difference compensation plates 27 and 28 arranged to satisfy relation (1), into circularly polarized light on the reflector (reflective electrode 26). At this time, the dark state can be achieved in the same manner irrespective of whether the direction of polarization is right-handed or left-handed. In other words, by converting the light of visible wavelength into either of the right-handed and left-handed circularly polarized lights in a uniform manner, a good dark state can be achieved.

In order to achieve the dark state, it is important to produce the optical function of the liquid crystal layer 20 that changes the incident light which is made linearly polarized light of a polarizing direction varying according to the wavelength, into a circularly polarized light, within a visible wavelength range, and set the directions of the optical phase difference compensation plates 27 and 28 accordingly.

Moreover, considering the electrical driving of the liquid crystal layer 20, since the bright state is achieved during the application of voltage, it is necessary to achieve the dark state in the absence of applied voltage or in a state in which the liquid crystal alignment changes by the application of voltage but the alignment state differs substantially from the alignment in the bright state.

Regarding the function of the dark state, the present inventors found a practically sufficient range, i.e., a range in which a sufficiently low reflectivity is ensured in a visible wavelength range, and a liquid crystal compound can be developed for a liquid crystal display device which is easily manufacturable at a high yield. The specific conditions are that the twist angle of the liquid crystal layer 20 is between 60 degrees and 100 degrees and the value And regarding the birefringence of the liquid crystal layer 20 given by the product of Δn (difference of refractive indices) of the liquid crystal and the thickness of the liquid crystal layer (layer thickness) d is between 150 nm and 330 nm, and more preferably between 250 nm and 300 nm.

An example of this embodiment will be explained in great detail below. However, the present invention is not necessarily limited to such an example.

EXAMPLE 2A

The following descriptions will explain Example 2A in which a liquid crystal display device of Embodiment 2 shown in FIG. 9 was fabricated by using a liquid crystal layer with a twist angle of 70 degrees, one optical phase difference compensation plate 27 with a retardation of 135 nm and one optical phase difference compensation plate 28 with a retardation of 270 nm. In this example, the electrode 26 on the substrate 24 was the reflective electrode 26 made of aluminum.

For the liquid crystal cell, a liquid crystal layer 20, which was adjusted to have a layer thickness of 4.5 μm after the introduction of the liquid crystal and twisted at 70 degrees, was used. As the liquid crystal, a liquid crystal whose Δn was adjusted to 0.0667 and other physical properties (dielectric anisotropy, elasticity, viscosity, nematic temperature range, and voltage retentive characteristic) were the same as that of a liquid crystal used in a typical thin-film transistor (TFT) transmissive type liquid crystal display was used. Additionally, it was set so that the product of the liquid crystal layer thickness and the birefringence ratio difference was 300 nm.

Figure 10:
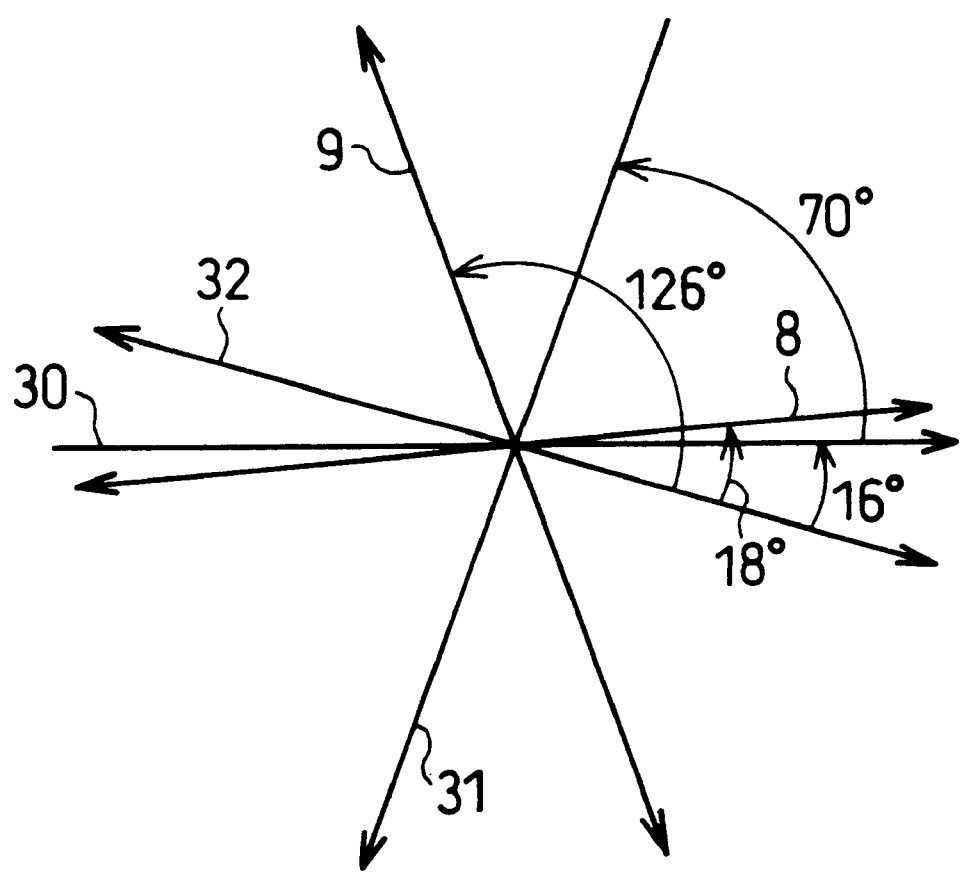
FIG. 10 is a plan view showing an arrangement of optical elements of a liquid crystal display device of Example 2A.

The polarizer 29, optical phase difference compensation plates 27 and 28 of this example were positioned as shown in FIG. 10. In FIG. 10, an arrow 32 indicates the transmissive axis direction of the polarizer 29, an arrow 8 shows the slow axis direction of the optical phase difference compensation plate 28, an arrow 9 shows the slow axis direction of the optical phase difference compensation plate 27, an arrow 30 shows the direction of alignment of liquid crystal molecules in contact with an alignment film 21 formed on the substrate 23, i.e., in the vicinity of the alignment film 21, and an arrow 31 shows the direction of alignment of liquid crystal molecules in contact with an alignment film 22 formed on the substrate 24, i.e., in the vicinity of the alignment film 22. Note that FIG. 10 shows the directions viewed along the direction of the incident light on the liquid crystal display device.

As illustrated in FIG. 10, the positional relationship of the above elements were such that the angle θ1 formed by the transmissive axis direction 32 of the polarizer 29 and the slow axis direction 9 of the optical phase difference plate 27 was 126°, the angle θ2 formed by the transmissive axis direction 32 of the polarizer 29 and the slow axis direction 8 of the optical phase difference compensation plate 28 was 18°, and the angle formed by the alignment direction 30 of the liquid crystal molecules on the substrate 23 and the transmissive axis direction 32 of the polarizer 29 was 16°.

Both of the optical phase difference compensation plates 27 and 28 are made of oriented films of polycarbonate. The optical phase difference compensation plate 27 has a phase difference controlled within a range between 130 nm and 140 nm for transmitted light of a wavelength of 550 nm in a direction normal to the plane (a direction normal to the optical phase difference compensation plate 27). The optical phase difference compensation plate 28 has a phase difference controlled within a range between 265 nm and 275 nm for transmitted light of a wavelength of 550 nm in a direction normal to the plane. Besides, the polarizer 29 includes an AR layer (antireflection coating layer) made of a dielectric multi-layer film, and an internal transmittance in a single piece is 45% in Y value.

Figure 11:
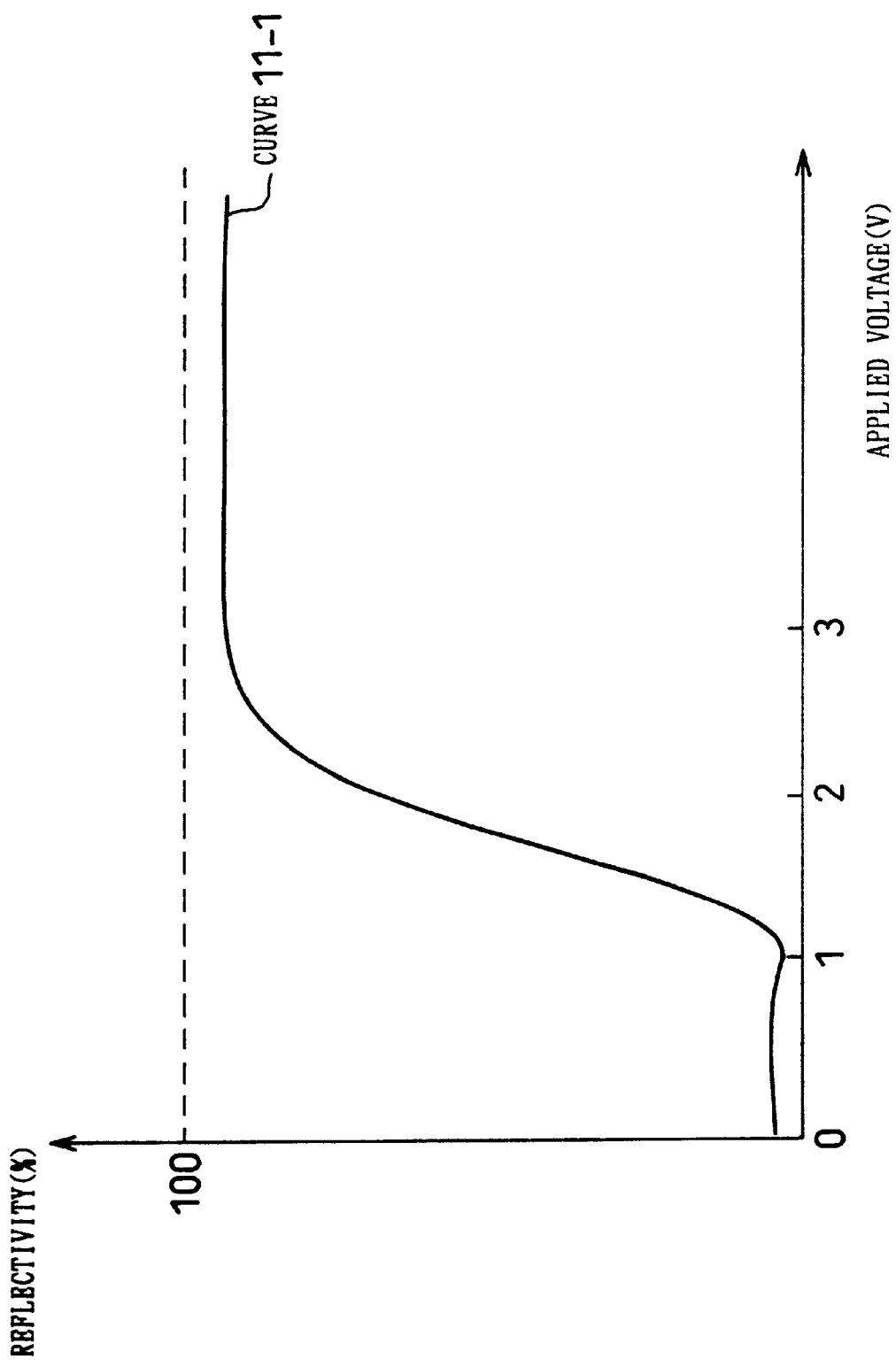
FIG. 11 is a view showing the measured value representing the dependence of the reflectivity of the liquid crystal display device of Example 2A on the applied voltage.
Figure 12:
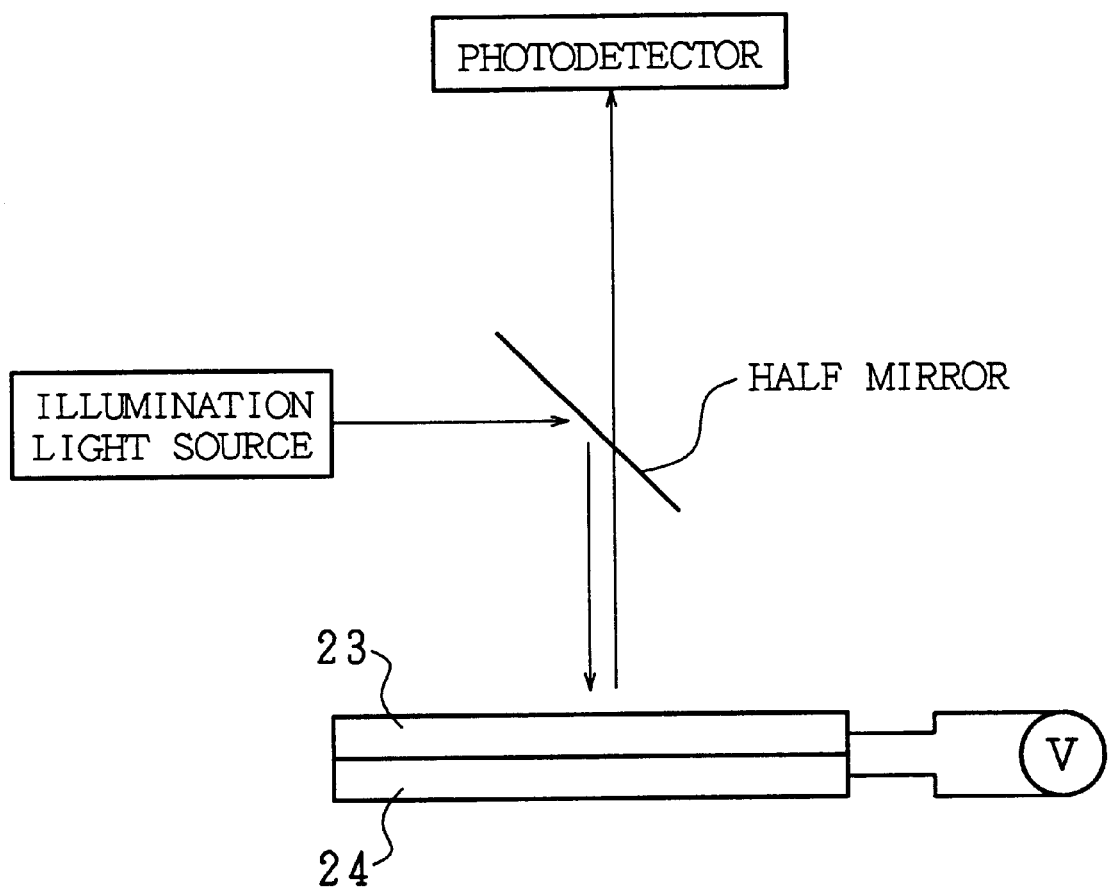
FIG. 12 is a conceptual view of an arrangement of a measurement optical system used for the measurement of FIG. 11.

Regarding the liquid crystal display device having the above-described structure of this example, the dependance of the reflectivity on the applied voltage is shown by a curve 11–1 in FIG. 11. As illustrated in FIG. 12, the reflectivity was measured by reflecting the light from the illumination light source by a half mirror so that the light was incident on a sample to be measured (the liquid crystal display device formed by the substrates 23 and 24) and the light reflected by the sample reached a photodetector through the half-mirror. For the measurement of the reflectivity, the reflectivity of the device which was constructed in the same manner as in this example except that a polarizer of the same type as the polarizer 29 was disposed directly on the substrate 23 without using the optical phase difference compensation plates 27 and 28, and that the liquid crystal was not filled was defined as 100%.

It can be understood from FIG. 11 that an excellent, high reflective characteristic was obtained with an applied voltage of not less than around 2 V.

As described above, in this example, a good black display was achieved by the laminated phase plate of Embodiment 1, and good display characteristics that did not deteriorate the brightness was achieved.

EXAMPLE 2B

The following descriptions will explain Example 2B of a liquid crystal display device of Embodiment 2, which is an active matrix driving-type color liquid crystal display device using a light reflecting pixel electrode (light reflecting means) 37 as a light reflecting film having smooth undulations, instead of the electrode 26.

Figure 13:
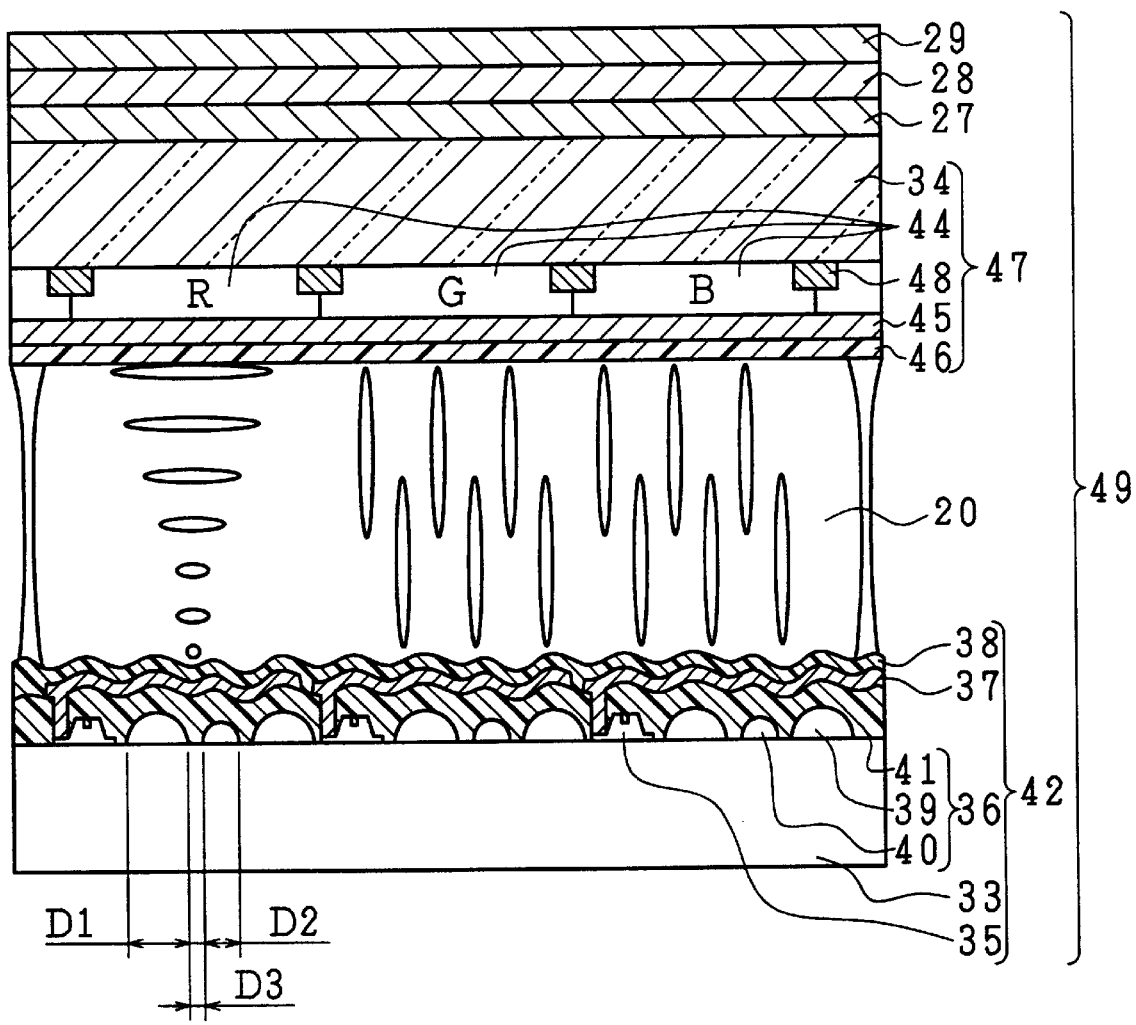
FIG. 13 is a cross sectional view of an essential section showing a schematic structure of a liquid crystal display device of Example 2B.

FIG. 13 is a cross sectional view of an essential section showing the structure of the reflective type liquid crystal display device of this example. As illustrated in FIG. 13, this reflective type liquid crystal display device 49 includes a first substrate 33, a second substrate 34 made of a transparent substrate, and a plurality of TFT elements 35 as active elements formed on the first substrate 33 for the respective pixels. An interlayer insulating film 36 is formed on the TFT elements 35 and driving-use wires (not shown). The drain (not shown) of the TFT element 35 and a light reflecting pixel electrode 37 are electrically connected through a contact hole. An alignment film 38 with a thickness of 100 nm is formed on the light reflecting pixel electrode 37.

The light reflecting pixel electrode 37 is placed on the liquid crystal layer 20 side of the first substrate 33. When the linearly polarized light which is visible light and has a fixed plane of vibration is incident on the optical phase difference compensation plate 28 by the polarizer 29, the light reflecting pixel electrode 37 reflects at least a part of the light which passes through the optical phase difference compensation plates 28, 27, a color filter substrate 47 (described later) and the liquid crystal layer 20 and is outgoing from the liquid crystal layer 20.

Here, the light reflecting pixel electrode 37 is a light reflecting film made of an electrically conductive material having a light reflecting property. As the electrically conductive material, it is possible to use, for example, aluminum, nickel, chromium, silver, and alloys thereof. The light reflecting pixel electrode 37 has smooth undulations, except in the section of the contact hole, thereby preventing the reflecting metal surface from reflecting as a specular surface.

Next, the fabrication method will be explained in great detail below.

A large number of great protrusions 39 and a number of small protrusions 40 were formed by a photosensitive resin material on a surface of the substrate 33 on which the TFT elements 35 and driving-use wires (not shown) were formed. The great protrusions 39 and small protrusions 40 were produced by forming a large number of circular patterns having bottom diameters of D1 and D2 (see FIG. 13), respectively, using a photolithography technique. For instance, D1 and D2 were set to 5 µm and 3 µm, respectively. The distance D3 between the great protrusion 39 and small protrusion 40 was arranged to be at least 2 µm. Besides, although the heights of the great protrusion 39 and small protrusion 40 were controlled by the film thickness of the photosensitive resin material during the formation, the heights were arranged to be 1.5 µm in this example. After forming the great protrusions 39 and small protrusions 40 by photolithography, they were made gradual protrusions by exposure and baking steps.

Thereafter, a planerization film 41 was formed from the same photosensitive resin material as that used for forming the protrusions 39 and 40 so as to cover the protrusions 39 and 40 and fill the flat portions between the protrusions 39 and 40. Thus, the surface of the planerization film 41 was made a smoothly curved surface as desired because of the effects of the protrusions 39 and 40. The fabrication was carried out so that neither the protrusions 39, 40 nor the planerization film 41 were formed in the contact hole.

The TFT element substrate 42 having the above-mentioned structure was fabricated as described above. According to this structure, since the light reflecting pixel electrode 37 which also serves as the reflector is disposed in the vicinity of the liquid crystal layer 20, no parallax occurs. Moreover, the light which passed through the liquid crystal layer 20 and was reflected by the light reflecting pixel electrode 37 was prevented from being lost due to the TFT elements 35 and element driving-use wires (not shown). In other words, a so-called aperture ratio was high. It was thus possible to achieve the TFT element substrate 43 for a bright, reflective type liquid crystal display device having a high aperture ratio, without causing parallax.

On the other hand, a color filter 44 designed for high brightness according to the reflecting method was placed on the other substrate used together with the above-mentioned TFT element substrate 42. The color filter 44 was provided with a black matrix 48 for preventing mixture of colors between pixels and preventing leakage of reflected light in a dark display resulting from the absence of applied voltage or electric field disorder in the domains between the pixel electrodes.

By mask-depositing (mask vapor deposition) ITO (indium tin oxide) as a transparent electrode on the color filter 44 by sputtering, a counter electrode 45 which has a 140 nm thick desired pattern and opposes to the light reflecting pixel electrode 37 for driving the TFT element. Then, an alignment film 46 was deposited on the counter electrode 45, thereby providing a color filter substrate 47.

The color filter 44 used here was designed so that it had a brightness suitable for a high contrast display mode using a polarizer. More specifically, the transmittance of the color filter substrate 47 is set to 53% in Y value when the ratio (aperture ratio) of the area where the black matrix 48 was not placed was 95%.

The TFT element substrate 42 and color filter substrate 47 thus prepared underwent an alignment treatment by rubbing, application of plastic spacer (not shown) for maintaining the thickness of the liquid crystal layer 20, and placement of sealing material at the peripheral section. A liquid crystal cell into which the liquid crystal is filled was prepared by placing the TFT element substrate 42 and color filter substrate 47 undergone the above-mentioned processes to face each other, adjusting their positions and curing the peripheral sealing material under applied pressure. Next, a liquid crystal material whose dielectric anisotropy $\Delta\epsilon$ was positive was introduced into the liquid crystal cell by a vacuum injection method, was cured and sealed under applied pressure, thereby producing the liquid crystal layer 20.

The direction of the liquid crystal display device will be hereinafter expressed by the up, down, right or left direction seen from the viewer positioned to face the liquid crystal display device with reference to a direction of the dial of a clock such that the up direction is described as the twelve o'clock direction.

The optical phase difference compensation plates 27 and 28 made of oriented films of polycarbonate were placed on a side of the color filter substrate 47, which side is not adjacent to the liquid crystal layer 20. Moreover, the polarizer 29 is positioned above the optical phase difference compensation plates 27 and 28.

In this example, like above-described Example 2A, the polarizer 29 and optical phase difference compensation plates 27 and 28 were positioned as shown in FIG. 10. Here, the alignment direction 30 of the alignment film 38 on the color filter substrate 47 was arranged to be 3 o'clock direction of the liquid crystal display device.

Besides, as the liquid crystal layer 20, a liquid crystal layer which was adjusted to have a layer thickness of 4.0 to 5.0 µm after filling the liquid crystal material was used. The thickness of the liquid crystal layer 20 varies depending on positions because of the undulations of the light reflecting pixel electrode 38. As the liquid crystal, a liquid crystal which had $\Delta$n of 0.0667 was used, and the product of the difference in refractive indices and the liquid crystal layer thickness was adjusted to be approximately 300 nm.

Furthermore, a driving circuit was mounted on the periphery of a liquid crystal display panel thus fabricated, thereby providing a liquid crystal display device.

Figure 14:
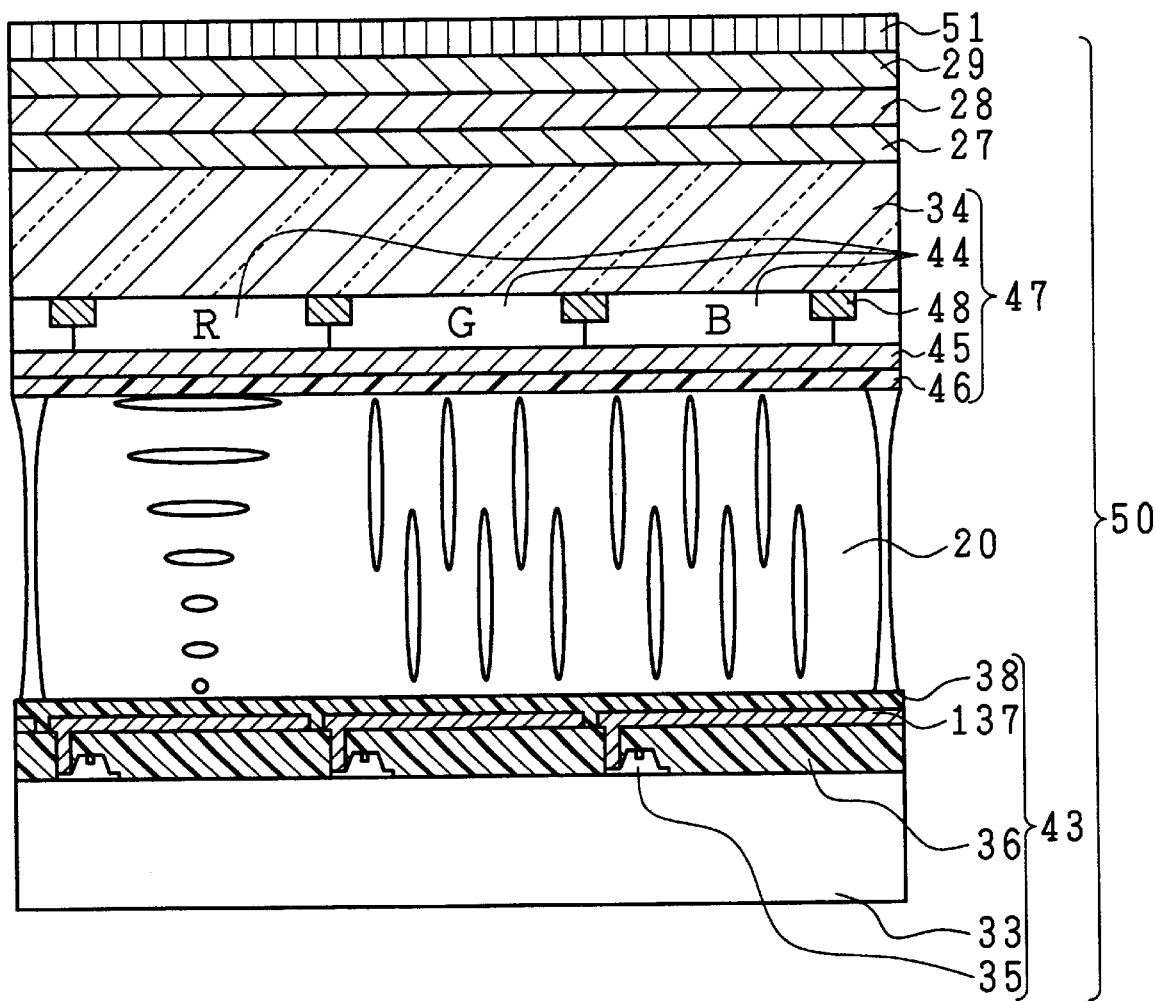
FIG. 14 is a cross sectional view of an essential section showing a schematic structure of a liquid crystal display device of Example 2B.

For comparison purposes, a reflective type liquid crystal display device 50 shown in FIG. 14 was fabricated. The reflective type liquid crystal display device 50 differs from the reflective type liquid crystal display device 49 in that the reflective type liquid crystal display device 50 includes a TFT substrate 43 having a light reflecting pixel electrode 137 which is formed by a flat reflecting plate without producing the protrusions 39 and 40, instead of the TFT element substrate 42 having the light reflecting pixel electrode 37. Except for this difference, the reflective type liquid crystal display device 50 was fabricated in the same manner as the reflective type liquid crystal display device 49.

In the reflective type liquid crystal display device 49, since the light reflecting pixel electrode 37 is disposed in the vicinity of the liquid crystal layer 20, an excellent high resolution display was achieved without parallax. Moreover, since the light was reflected by the undulations provided for the light reflecting pixel electrode 37, an excellent white display was achieved without reflecting the face of the viewer in the display. Furthermore, since no element having a diffusing property was disposed in front of the liquid crystal display device, a good dark state was shown, thereby achieving a high contrast display.

In addition, since the color filter 44 having high brightness is used, although this liquid crystal display device provides a display using the polarizer 29, a sufficient brightness is ensured. Therefore, it is possible to prevent deterioration of color purity which would occur when the reflectivity in the dark state is low and reflected light from a color element set to be in the dark state is observed together with reflected light of a color element set to be in a bright state. Consequently, although the color filter 44 had a high brightness and a low saturation, excellent color reproducibility that did not lower the color reproducible range of the color filter 44 was achieved.

Besides, by setting the voltage to be applied to each pixel for an intermediate state between the dark state and bright state, no problems occur in gray scale or half tone reproduction. Hence, there is no problem in the expression of half-tone colors of the respective colors of the color filters 44. Moreover, it was confirmed in actual driving that the speed of response did not cause any problem in the reproduction of a moving picture.

On the other hand, in the reflective type liquid crystal display device 50, like the reflective type liquid crystal display device 49, since the light reflecting pixel electrode 137 is disposed in the vicinity of the liquid crystal layer 20, it is possible to provide an excellent high resolution display without parallax. However, since the light reflecting pixel electrode 137 was flat, it caused mirror reflection in the bright state, and the face of the viewer was reflected in the light reflecting pixel electrode 137. Therefore, it was necessary to provide a scattering film 51 on the polarizer 29 so as to prevent such a reflection, and make a specular bright display a white display.

When a film which could achieve a sufficient brightness in a wide view range was selected as the scattering film 51, a sufficient visibility could not be obtained because the resolution was lowered due to too strong scattering property. Alternatively, when a film having a weak scattering property was selected as the scattering film 51, the brightness was insufficient, the specular reflection factor was high, the visible range was narrow, and the practicality was insufficient. In both of the cases, compared with the reflective type liquid crystal display device 49, since an element having a scattering property was placed in front of the reflective type liquid crystal display device 50, the illumination light was directly scattered and the contrast ratio was lowered in the dark state. Moreover, the resolution was lowered due to scattering, and the visibility was worse.

Furthermore, the scattering film 51 was placed between the polarizer 29 and the optical phase difference compensation plate 28 so as to reduce light which was directly scattered from the scattering film 51 and observed. However, like the above, when a scattering film 51 with a high scattering property was used, the contrast was lowered. On the other hand, when a scattering film 51 with a low scattering property was used, the specular reflection component was high. In other words, in both of the cases, a sufficient visibility was not obtained.

Additionally, in the reflective type liquid crystal display device 50, the same color filter having a high brightness as that used in the reflective type liquid crystal display device 49 was used. However, regarding the color reproduction ability, the color purity was lowered because directly scattered light from the scattering film 51 affects the reflected light of the color element whose reflected light is set to be in the bright state. Therefore, compared with the reflective type liquid crystal display device 49, the reproducibility of the reflective type liquid crystal display device 50 was worse as the color reproducible range of the color filter 44 was lowered considerably and the color purity deteriorated.

It was confirmed by comparing the reflective type liquid crystal display devices 49 and 50 that the reflective pixel electrode 37 having smooth undulations is effective for ensuring resolution, brightness, contrast, and color purity.

As described above, according to this example, it was possible to realize a reflective type liquid crystal display device capable of providing a grey-scale display and dynamic display and ensuring a good color reproducible range by a practical fabrication method.

EXAMPLE 2C

The following descriptions will explain Example 2C which is based on a reflective type liquid crystal display device of Example 2B, increases the brightness by fabricating a light reflecting film with undulations having anisotropy in a plane as a light reflecting pixel electrode 37, and orients a good tilted direction of a tilted viewing angle of the liquid crystal layer 20 in a direction of a higher brightness of the light reflecting film.

In Example 2C, a reflective type liquid crystal display device was fabricated by forming a pattern different from Example 2B so that the undulations of the light reflecting pixel electrode 37 of the reflective liquid crystal display device of Example 2B varied according to the direction in a plane in which the light reflecting pixel electrode 37 was formed (i.e., the direction in the first substrate 33).

Figure 15:
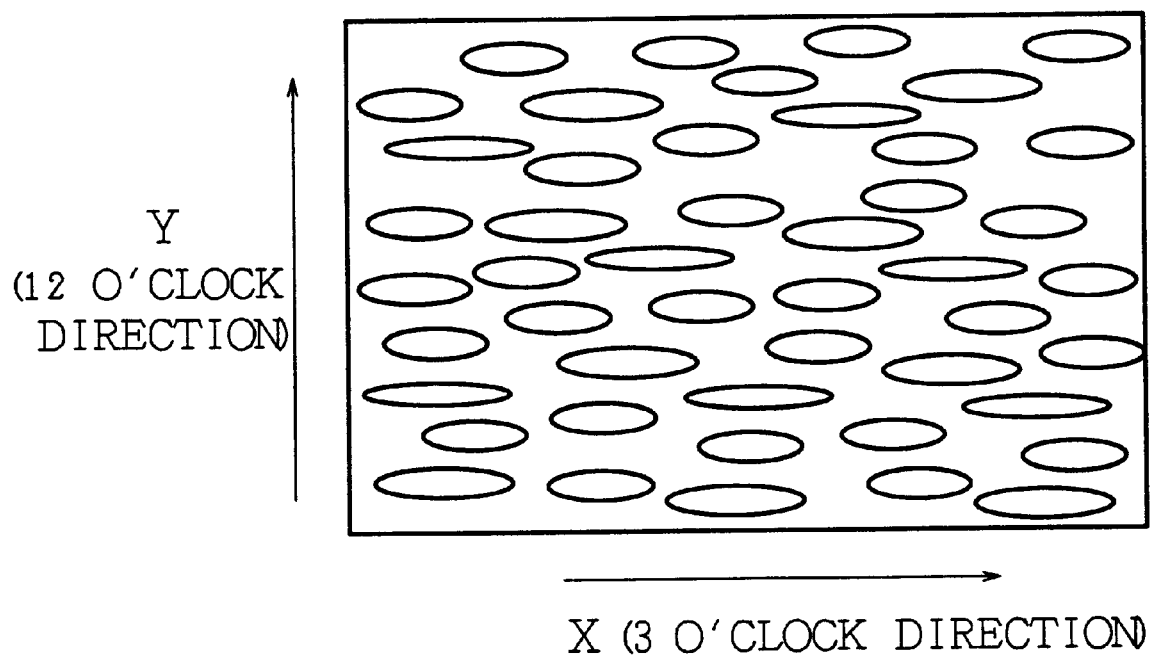
FIG. 15 is a partially enlarged plan view showing the undulations of a light reflector used in a reflective type liquid crystal display device of Example 2C.
Figure 16:
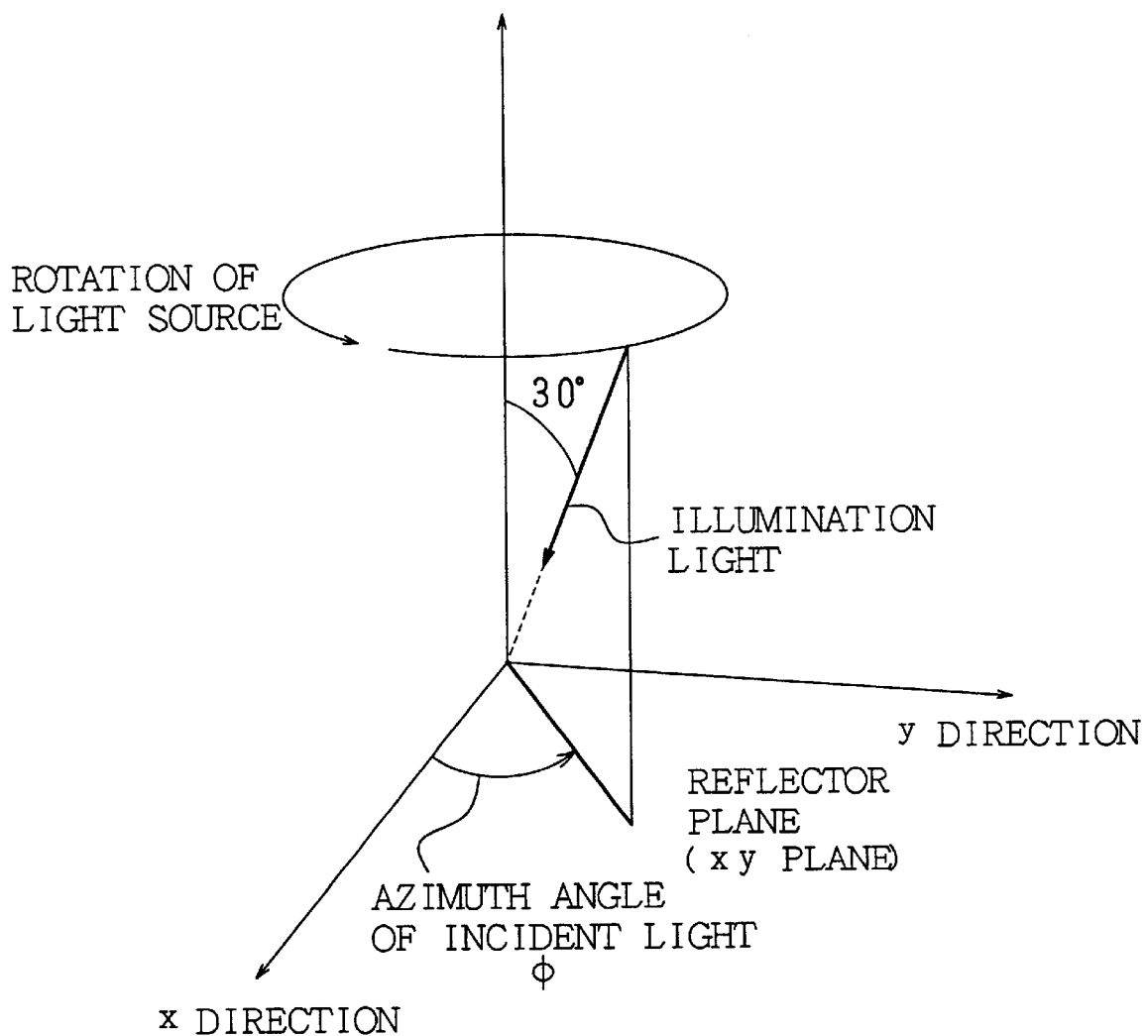
FIG. 16 is a conceptual view showing a measurement direction of a measurement optical system used for measuring the reflecting characteristics of a reflective electrode (light reflector) of Example 2C.

In this example, as a pattern satisfying the above-mentioned condition, an undulation which had an elliptical shape rather than a circular shape and anisotropy was formed as shown in the enlarged plane view of the essential section of FIG. 15. The reflecting characteristics of the light reflector (light reflecting pixel electrode 37) having such undulations were measured with the measurement arrangement shown in FIG. 16. More specifically, as shown in FIG. 16, the illumination light was incident on the reflector from a 30° tilted direction, and the intensity of reflected light traveling in a direction normal to the reflector surface was measured while rotating the light source, thereby measuring the anisotropy of the reflection.

Figure 17:
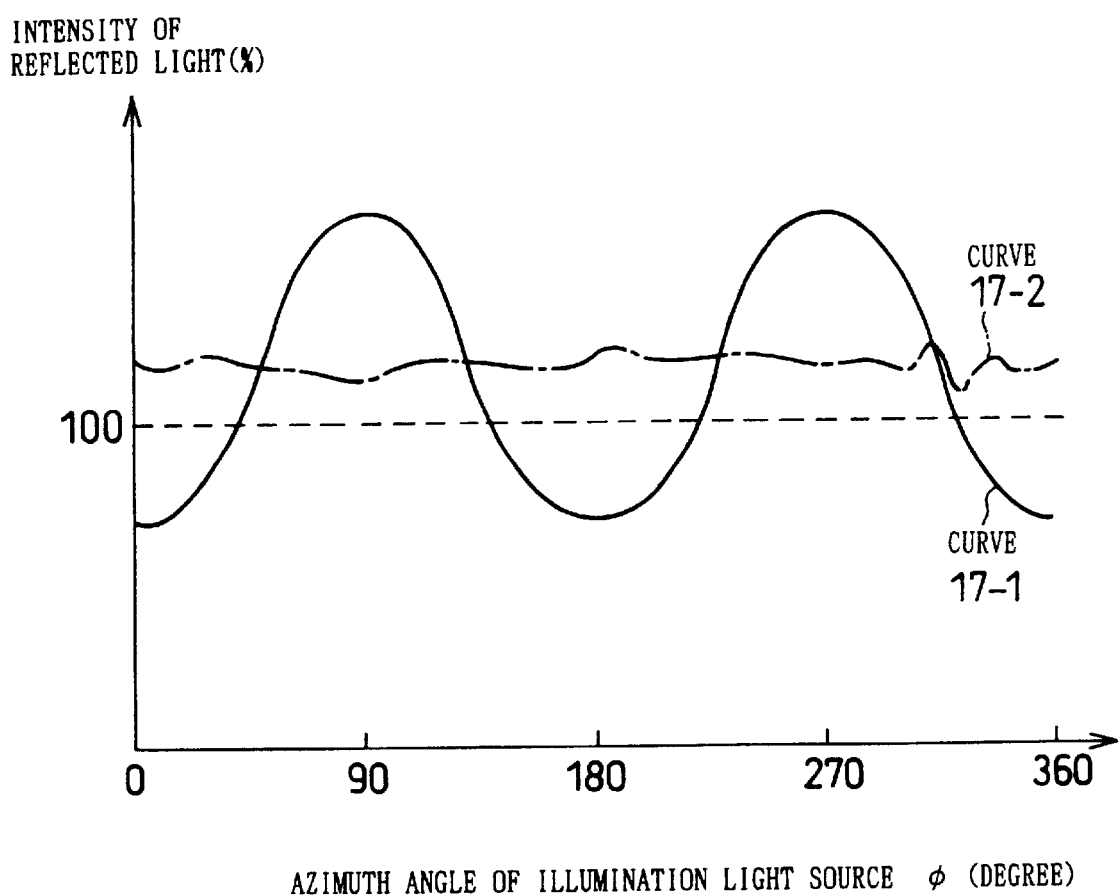
FIG. 17 is a view showing the measured value representing the reflecting characteristics of a reflective electrode (light reflector) of Example 4 by the measuring system shown in FIG. 16.

FIG. 17 shows the results of the measurements. It was confirmed from the results that the light from a certain direction was efficiently directed to the directly front direction of the liquid crystal display device. However, considering that the refractive index of the liquid crystal material differs from the air to a great degree, an immersion oil (matching oil) with a refractive index of 1.516 was dropped on the reflector and then a transparent glass plate was adhered onto the reflector for measurements. The measured value was obtained by converting the value obtained by measuring a standard diffusion plate (standard white plate) made of MgO under the same conditions as the reflector into 100%.

In FIG. 17, the curve 17-1 shows the equivalent measured value of the anisotropic diffusion reflector (light reflecting pixel electrode 37) of this example, and the curve 17-2 shows the measured equivalent value obtained by measuring a diffusion reflector (light reflecting pixel electrode 37) similar to the one used in Example 2B under the same conditions.

As shown in FIG. 17, it is understood from the results indicated by the curve 17-1 representing the reflector (light reflecting pixel electrode 37) having such a directional (anisotropic) property that the average interval of the undulations of this example varies according to a direction in the plane of the reflector that the reflecting brightness (intensity of reflected light) changes greatly with a variation in the incident direction ϕ of the illumination light. Whereas, in the curve 17-2 representing the reflector (light reflecting pixel electrode 37) having the undulations of Example 2B without an anisotropic property, the change in the reflecting brightness (intensity of reflected light) with the variation in the incident direction ϕ of the illumination light is not so large.

As a result, the present inventors found that such directional property (anisotropic property) that varies the average interval of undulations according to the direction in the plane of the reflector such as the reflector (light reflecting pixel electrode 37) used in this example functions as an effective means for improving the reflecting brightness. Moreover, it was confirmed from FIG. 17 that the direction of ϕ=90° or 270° is the direction in which the average interval of the undulations is short, and the reflecting brightness of the illumination light from that direction was high.

Alignment films 38, 46 similar to those of Example 2B were formed on a TFT element substrate 42 having a reflector (light reflecting pixel electrode 37) with the above-mentioned characteristics and on a color filter substrate 47 fabricated in the same manner as in Example 2B, and an aligning treatment was performed so that the twist angle was 70°. Thereafter, a reflective type liquid crystal display device of this example was fabricated in the same manner as in Example 2B.

The reflective type liquid crystal display device of this example having the reflector (light reflecting pixel electrode 37) with such undulations was observed by eyes from its directly front direction. It was found that the reflective type liquid crystal display device of this example achieved a display of a higher brightness, and the brightness improving effect of the anisotropic undulations appeared. At this time, the reflection brightness became higher when the illumination light was incident from a 12 o'clock direction and a 6 o'clock direction. Moreover, the illumination light was applied from the directly front direction of the liquid crystal display device, and the liquid crystal display device was viewed from a tilted direction. In this case, the brightness was also higher when the illumination light was incident from a 12 o'clock direction and a 6 o'clock direction.

Furthermore, the illumination light was applied from the directly front direction of the liquid crystal display device, and the liquid crystal display device was viewed from various directions tilted at 45 degrees from the directly front direction. In this case, a change in the display due to the tilt was not particularly felt when the liquid crystal display device was viewed from a direction for higher brightness.

As described above, according to this example, it is possible to provide a high quality display using a high contrast ratio obtained by the polarizer, optical phase difference compensation plates and liquid crystal modulation layer (liquid crystal layer) of the present invention.

Needless to say, it is possible to change the direction of the anisotropic undulations of the reflector (light reflecting pixel electrode 37) used in this example according to a main working environment of the liquid crystal display device of the present invention. In this case, it is possible to provide a display with high brightness and good tilted viewing angle characteristics by aligning the liquid crystal of the liquid crystal layer 20 and orienting the polarizer 29 and optical phase difference compensation plates 27, 28 in directions for achieving high brightness and good tilted viewing angle characteristics.

EXAMPLE 2D

The following descriptions will explain a liquid crystal display device of Example 2D which is based on a reflective type liquid crystal display device of Example 2B, and in which the liquid crystal layer is formed by a composite dispersing element including a low molecular liquid crystal compound and an oriented polymer obtained by fixing the liquid crystalline orientation.

Figure 9A:
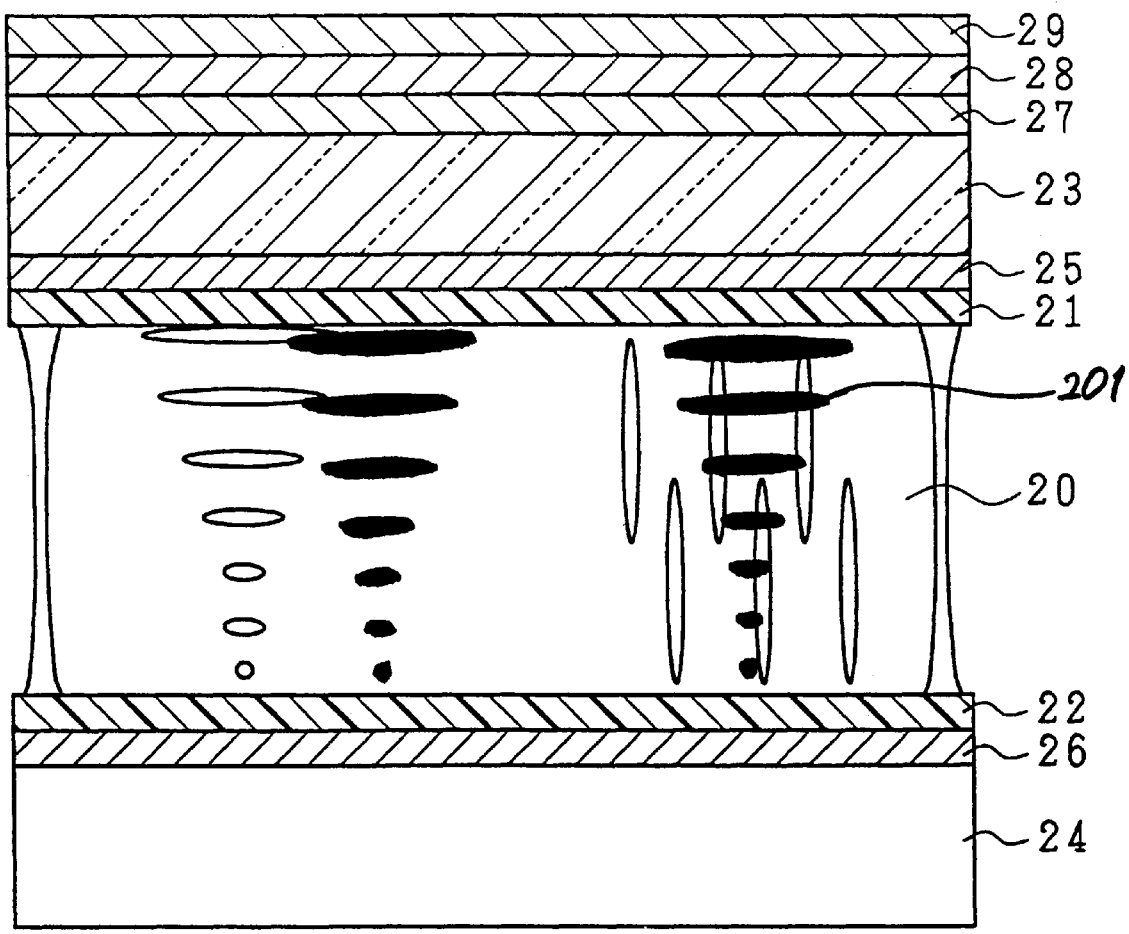
FIG. 9(a) is a cross sectional view of an essential section showing a schematic structure of a liquid display device consistent with the principles of the present invention.

A schematic structure of the liquid crystal display device fabricated in this example is shown in FIG. 9(a). Here, the electrode 26 was a reflective electrode (light reflecting means) 26 made of flat aluminum. The liquid crystal layer 20 was made of a composite dispersing element including a low molecular liquid crystal which was responsive to a voltage and a polymer 201 with a fixed liquid crystalline orientation which was not responsive to a voltage.

Next, the following descriptions will explain in great detail the fabrication and structure of the liquid crystal layer 20 of this example.

First, a liquid crystal compound with a positive dielectric anisotropy, a prepolymer and a polymerization initiator were mixed to prepare a material for the liquid crystal layer 20. The liquid crystal compound used here was a liquid crystal compound used for a typical TFT, and had a difference of refractive indices Δn adjusted to 0.07. The prepolymer used here had a liquid crystallinity at ordinary temperature, and a characteristic that it maintained the liquid crystal orientation even after it was made a polymer by polymerization. Here, the difference of refractive indices Δn was 0.12. The respective components of the material for the liquid crystal layer 20 were mixed in such a ratio that 85% by weight of the liquid crystal compound, 14% by weight of the prepolymer, and 1% by weight of the polymerization initiator.

Thereafter, the mixture of these components were heated and mixed so as to be uniform mixture, the mixture was changed to an isotropic phase and introduced into a liquid crystal cell while maintaining the temperature, and then the temperature was lowered. As a result, a uniform liquid crystal orientation was obtained. At this time, the twist angle of the liquid crystal layer 20 was set at 70° as shown in FIG. 10 explained above, and the liquid crystal layer was fabricated with a layer thickness of 4 μm.

Next, ultraviolet light was exposed to the liquid crystal-prepolymer mixture having such a liquid crystal orientation at room temperature. As a result, a liquid crystal-polymer composite dispersing element having a fine phase separation structure was obtained. The amount of ultraviolet light applied was 2000 mJ/cm².

The composite dispersing element thus fabricated did not show scattering in the absence of applied voltage, but exhibited scattering upon the application of a voltage. Moreover, the composite dispersing element changed from a mirror state to a white state with the application of voltage with the help of the reflecting property of the electrode 26.

With the use of only the composite dispersing element, when the voltage is not applied, the display surface is in the mirror state, and therefore black can not be displayed. Hence, like Example 2A, a laminated phase plate of the present invention and a polarizer were provided. These optical elements were arranged as shown in FIG. 10.

Like Example 2A, a liquid crystal display device was fabricated by disposing the laminated phase plate (optical phase difference compensation plates 27, 28) and polarizer on the liquid crystal layer 20 made of the liquid crystal-polymer composite dispersing element thus formed, and the intensity of the reflected light was measured.

Figure 18:
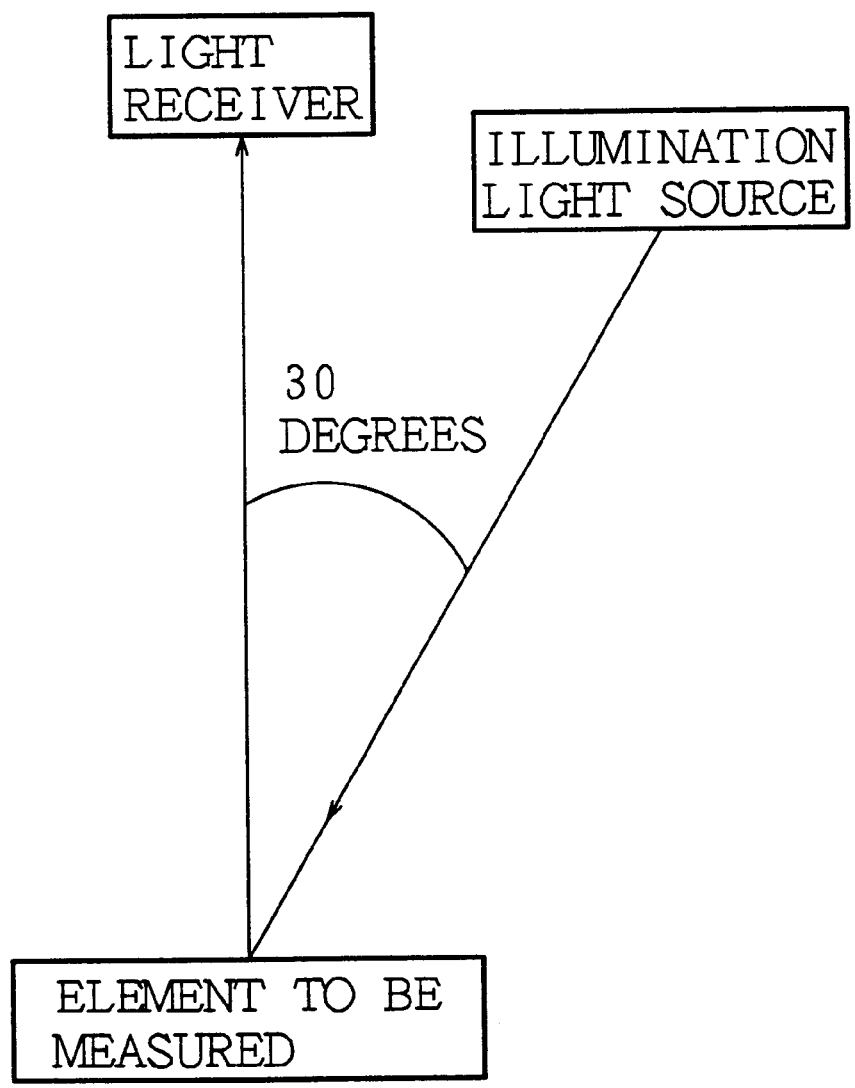
FIG. 18 is a conceptual view showing an arrangement of a measurement optical system used for measuring the reflectivity in a non-specular arrangement of a liquid crystal display device of Example 2D.

In this case, the measurement was carried out by measuring the mirror reflectivity with the same arrangement as that shown in FIG. 12 of Example 2B, and also measuring the reflectivity in the non-mirror arrangement with the arrangement shown in FIG. 18. More specifically, as shown in FIG. 18, the measurement in the non-mirror arrangement was carried out by illuminating light from an illumination light source to an element to be measured (liquid crystal display device) and receiving light which was reflected from the element and travelled in a direction perpendicular to the plane direction of the element by a light receiver. The illumination light source, the element to be measured and the light receiver were arranged so that the angle formed by the directions of the incident light from the illumination light source and the reflected light from the element was 30 degrees.

Figures 19A, 19B:
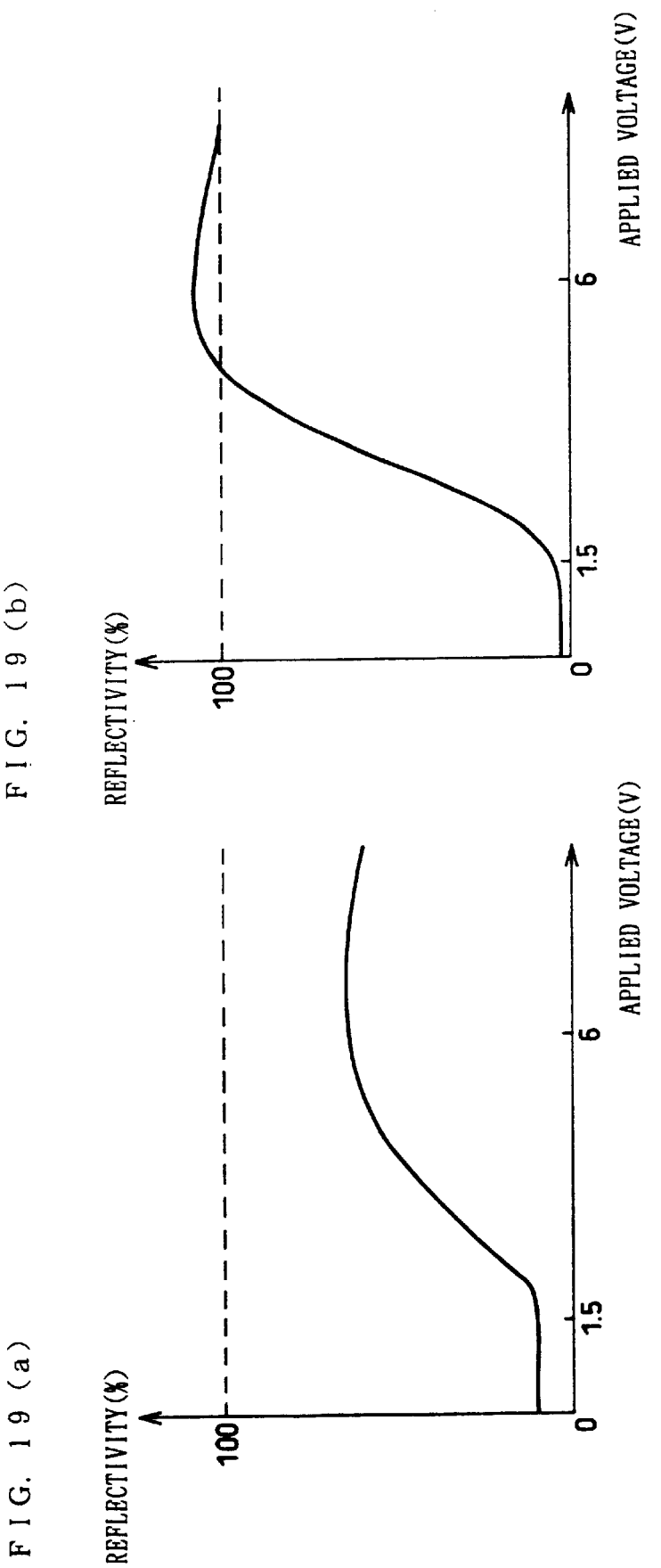
FIGS. 19(a) and 19(b) are views showing the measured values representing the dependence of the reflectivity of the liquid crystal display device of Example 2D on the applied voltage.

As the results of the measurement, the dependence of the reflectivity on the applied voltage is shown in FIGS. 19(*a*) and 19(*b*). FIG. 19(*a*) shows the results of the measurement in the mirror reflection arrangement, and FIG. 19(*b*) shows the results of the measurement in the non-mirror arrangement. Moreover, in the non-mirror arrangement, a direction along which the illumination light was incident on the liquid crystal display device was arranged to be the highest brightness direction by placing the liquid crystal display device at the position of the element to be measured shown in FIG. 18 and rotating in the plane of the display surface. The mirror reflectivity given by this measurement of mirror reflectivity is expressed by a converted value when a reflectivity in a structure where the polarizer 29 was adhered to the liquid crystal cell into which the liquid crystal was not introduced without using the optical phase difference compensation plates 27, 28 is set at 100%. Furthermore, the reflectivity at the non-mirror arrangement is expressed by a converted value when a reflectivity of a standard white plate made of MgO measured in the same arrangement is set at 100%.

As shown in FIGS. 19(*a*) and 19(*b*), both of the mirror reflected light and non-mirror reflected light drew ascent curves of the same tendency for the voltage applied to the liquid crystal display device.

The structure of this example having the liquid crystal layer 20 made of the composite dispersing element including the liquid crystal and polymer differs from the structure of Example 2A in which the liquid crystal layer 20 consists only of the liquid crystal. The reflectivity shown in FIG. 19(*a*) of this example is lower than that of Example 2A on the whole. The reason for this is that the proportion of light travelling in directions other than the incident direction on the light receiver due to the scattering of polymer in the liquid crystal layer 20 in the reflected light from the liquid crystal display device increases with a rise in the voltage and therefore the reflection brightness is weakened.

Besides, the curve shown in FIG. 19(*b*) indicates that a brighter state compared to the standard white plate made of MgO is achieved with the application of the voltage.

Moreover, the following was found as a result of observing the liquid crystal display device of this example by eyes. Specifically, when the applied voltage was 1.5 V, a dark state was provided, the mirror reflection was small and the surrounding image was not reflected in the display. When the applied voltage was 6 V, a white display was achieved and a mirror state was not seen by eyes unless the surrounding light source was reflected in the display surface. Even when the light source was reflected in the display surface, the mirror reflected light was not particularly colored. Besides, according to the observation by eyes, although the brightness depended on the azimuth angle of the incident light, the difference in the brightness was such a level that did not cause a substantial problem.

As described above, in this example, the laminated phase plate (optical phase difference compensation plates 27, 28) of the present invention was employed for a liquid crystal display device including the liquid crystal layer 20 made of the liquid crystal-polymer composite element. With this structure, a good dark state as well as a good bright state were provided, and a good white display was achieved by the scattered light.

EXAMPLE 2E

The following descriptions will explain a liquid crystal display device of Example 2E which is based on a reflective type liquid crystal display device of the second embodiment, and in which a liquid crystal layer having a negative dielectric anisotropy was used as the liquid crystal of the liquid crystal layer 20, a rubbing treatment was applied only to the substrate 23 located on the light incident side, a chiral dopant was mixed with the liquid crystal, and $|d/P|$, wherein p is the natural pitch of the liquid crystal and d is the thickness of the liquid crystal layer 20, of the liquid crystal layer 20 was 0.33.

First, the operation theory for the display of the liquid crystal display device will be explained.

When homeotropically aligned chiral nematic liquid crystal is sandwiched between the substrates, the liquid crystal molecules are homeotropically aligned under certain conditions. This is a known phenomenon.

In the case where the thickness of the liquid crystal layer 20 is denoted as d and the natural pitch of the liquid crystal is denoted as p, it has been known from the theoretical analysis that a homeotropic alignment was achieved when d and p satisfy equation (2) shown below. The natural pitch of the liquid crystal is of two types: right-handed twist and left-handed twist. Here, the left-handed twist and right-handed twist are represented by "−−" and "+", respectively.

$$|d/p| < K_3/(2 \times K_2) \qquad (2)$$

where both $K_2$ and $K_3$ represent the elastic constants of Frank corresponding to the twist and bend of a director of the liquid crystal. Since $K_3/K_2$ normally becomes a value close to 2, d and p need to satisfy $|d/p|<1$. When this condition is satisfied, the liquid crystal molecules are homeotropically aligned and do not exhibit birefringence for light travelling in a direction normal to the liquid crystal display device. Therefore, when linearly polarized light produced by the laminated phase plate (optical phase difference compensation plates 27, 28) of the present invention is incident on the liquid crystal layer 20, the incident light reaches the reflective electrode 26 without changing in polarization. It is thus possible to achieve a good display state.

Moreover, when a voltage is applied, the liquid crystal changes the polarization state of the linearly polarized light incident from a direction tilted from a direction normal to the substrate. If this results in a circular polarization state, it is possible to achieve a good dark display. The present inventors eagerly studied and found as a result of the study that the incident linearly polarized light can be converted into circular polarization only when |d/p| and the retardation of the liquid crystal layer 20 have values within certain ranges.

Figure 24:
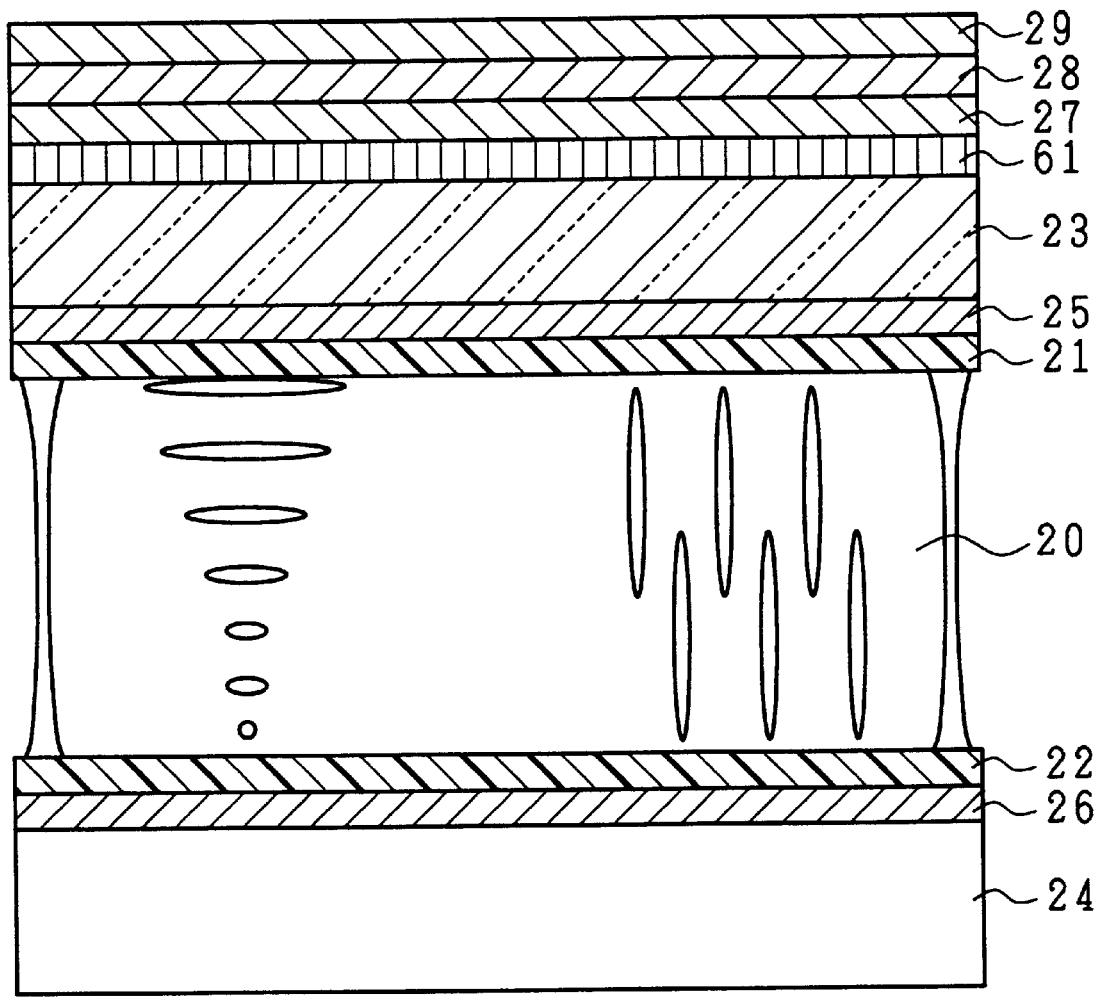
FIG. 24 is a cross sectional view showing the structures of reflective type liquid crystal display devices of Examples 2E and 2F.

The liquid crystal display device fabricated in this example is a liquid crystal display device of the second embodiment and further includes a viewing angle compensation plate 61 between the optical phase difference compensation plates 27 and substrate 23 as schematically shown in FIG. 24.

Here, a reflective electrode 26 made of flat aluminum was used. Moreover, a polyimide based homeotropic alignment film was used as the alignment film 26, and a tilt angle was formed by rubbing the alignment film 21. The tilt angle was tilted at 2 degrees from a direction normal to the substrate 23. In this example, only the substrate 23 was rubbed, but it was confirmed that a uniform orientation was also obtained by applying the rubbing treatment to both of the upper and lower substrates 23, 24.

In the present invention, as the alignment film 21 (and 22), it is possible to use a film capable of aligning the liquid crystal molecules contained in the liquid crystal layer 20 homeotropically to the insulating substrate 23 (and 24), i.e., a homeotropic alignment film. As the homeotropic alignment film, it is possible to use any known films if they have the above-mentioned property. Examples of the homeotropic alignment film is a material having a structure in which a long-chain alkyl group is bonded to a polyimide backbone. More specifically, polyimide based resins such as JALS-203 (available from JSR Co., Ltd.) and SE-7511L (available from Nissan Chemical Industries, Ltd.) can be used as the homeotropic alignment film.

The thickness of the alignment film 21 (and 22) is around 0.05 to 0.1 μm. For example, the alignment film 21 (and 22) is formed by applying a solution having a polymer dissolved therein by spincoating (spinner coating method), immersion application method, screen printing method, roll printing method or other method, and then drying the solution. It is also possible to use a method in which a solution of precursor of the polymer is applied by the above-mentioned method and then cured under predetermined curing conditions (heating, irradiating light, etc.). Alternatively, the alignment film 21 (and 22) can be formed by the Langmuir-Blodgett method.

Next, the liquid crystal used for the liquid crystal layer 20 is not particularly limited if it has the negative dielectric anisotropy (n type). For instance, ZLI-2857, ZLI-4788, ZLI-4780-000 (all of them are available from Merck Japan) can be used. Moreover, the thickness of the liquid crystal layer 20 is preferably between 3 and 12 μm.

It is possible to adjust |d/p| to a desired value by adding the chiral dopant to the liquid crystal. As the chiral dopant, it is possible to use any known chiral dopants, for example, S-811 (available from Merck Japan), and cholesteryl nanoate. In the case when the liquid crystal display device is used in a wide temperature range, it is possible to use a chiral dopant with a helical twisting power whose change with the temperature is reverse to tho above-mentioned examples. Examples of such a chiral dopant is S-1011 (available from Merck Japan).

In this example, ZLI-2857 with a negative dielectric anisotropy available from Merck was used as the liquid crystal of the liquid crystal layer 20, and S-811 available from Merck was added to the liquid crystal of the liquid crystal layer 20. The liquid crystal cell was adjusted so that the thickness of the liquid crystal layer 20 after introduction of the liquid crystal was 4.5 μm. Since Δn of ZLI-2857 was 0.074, the product Δnd of the thickness of the liquid crystal layer 20 and the difference of refractive indices was arranged to be 333 nm. Since the value of |d/p| as the ratio of the pitch p of the liquid crystal and the thickness d of the liquid crystal layer 20 was arranged to be 0.33, the liquid crystal molecules are homeotropically aligned in the initial state. As the liquid crystal, it is possible to use a TFT-use liquid crystal compound having normal liquid crystalline properties except the negative dielectric anisotropy.

Figure 25:
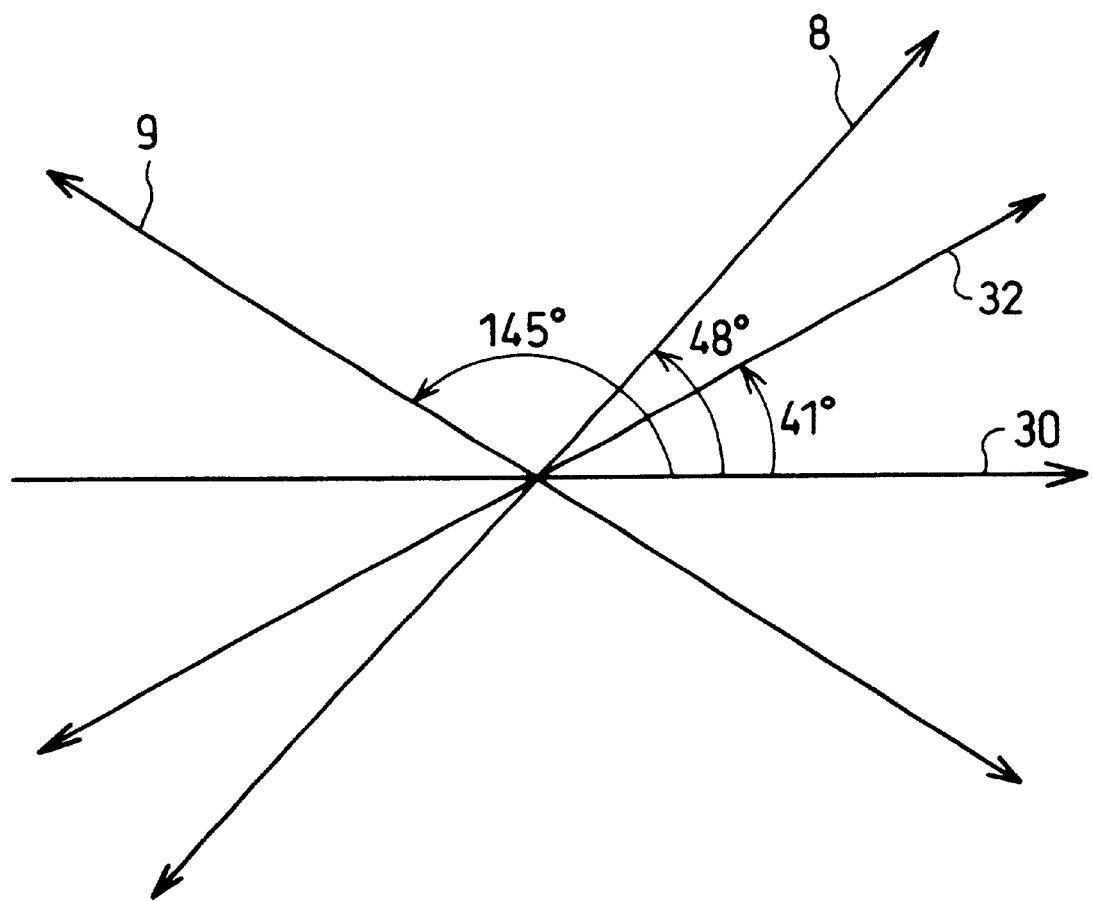
FIG. 25 is a plan view showing the setting orientations of polarizers and optical phase difference compensation plates of the reflective type liquid crystal display devices of Examples 2E and 2F.

In this example, the polarizer 29, optical phase difference compensation plates 27 and 28 were arranged as shown in FIG. 25. In FIG. 25, an arrow 32 shows the transmitting axis direction of the polarizer 29, an arrow 8 shows the slow axis direction of the optical phase difference compensation plate 28, an arrow 9 shows the slow axis direction of the optical phase difference compensation plate 27, and an arrow 30 shows the alignment direction of the liquid crystal molecules in contact with the alignment film 21, i.e., in the vicinity of the alignment film 21, formed on the substrate 23. FIG. 25 is a view observed from a direction of the incident light on the liquid crystal display device.

As shown in FIG. 25, the positional relationship of these elements was arranged such that the angle θ1 between the transmitting axis direction 32 of the polarizer 29 and the slow axis direction 9 of the optical phase difference compensation plate 27 was 104°, and the angle θ2 between the transmitting axis direction 32 of the polarizer 29 and the slow axis direction 8 of the optical phase difference compensation plate 28 was 7°, and the angle between the alignment direction 30 of the liquid crystal molecules on the substrate 23 and the transmitting axis direction 32 of the polarizer 29 was 41°. The material for the optical phase difference compensation plates 27, 28 was the same as that used in Example 2A.

These positions of these optical phase difference compensation plates 27, 28 were arranged at positions for improving the optical characteristics in the directly front direction of the of the liquid crystal display device after fabrication. However, it is possible to change the design of the optical phase difference compensation plates 27 and 28 and the liquid crystal layer 20 in view of the characteristics observed from a tilted direction. As a design for changing the phase difference between the optical phase difference compensation plates 27 and 28 for transmitted light along a tilted direction while satisfying the setting angle conditions of the laminated phase plate (optical phase difference compensation plates 27, 28), it can be achieved by replacing at least one of the uniaxial optical phase difference compensation plates 27, 28 with a biaxial optical phase difference compensation plate.

In this example, the viewing angle compensation plate 61 was further provided to improve the viewing angle characteristics. With the use of the viewing angle compensation plate 61, the liquid crystal display device of this example achieves a normally white mode, thereby realizing a bright display.

The polarizer 29 includes an AR layer made of a dielectric multi-layer film, and its own internal transmittance is 45%.

Figure 26:
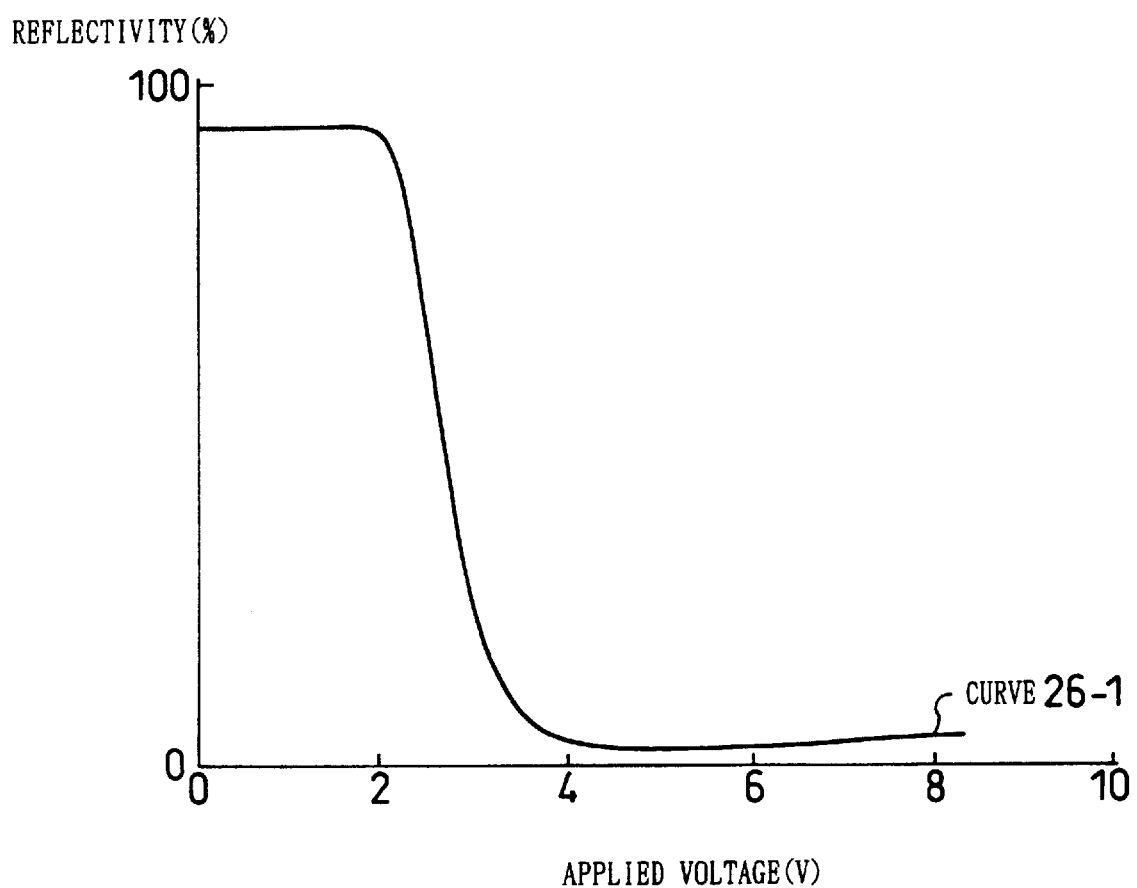
FIG. 26 is a view showing the measured values representing the dependence of the reflectivity of the reflective type liquid crystal display device of Example 2E on the applied voltage.

Regarding the liquid crystal display device having the above-described structure of this example, the dependance of the reflectivity on the applied voltage is shown by a curve 26-1 in FIG. 26. Like Example 2A, the reflectivity was measured by a measuring device having the structure shown in FIG. 12.

It can be understood from FIG. 26 that a good high reflectivity was obtained with the application of a voltage ranging from 0 V to 2 V. However, the vertical axis of the graph shows a converted reflectivity obtained when a reflectivity of the polarizer 29 alone is set to 100%. As the reflectivity of the liquid crystal display device, a maximum of about 90% was achieved. Moreover, by arranging |d/p| to be 0.33, it was possible to provide a good black display without coloring a dark state. Regarding a white display in the absence of applied voltage, a good white display having a wide viewing angle without inversion of the display was realized by the viewing angle compensation plate 61, and a contrast ratio of 20 was achieved.

A structure where the flat reflector was used as the electrode 26 and the rubbing treatment was applied only to the alignment film 21 was described above. However, it was also confirmed that the same effect was produced even when the rubbing treatment was applied to both of the alignment films 21 and 22.

Additionally, it was confirmed that the same effect was produced with the use of the reflector with smooth undulations (light reflecting pixel electrode 37) of Example 2B or the anisotropic reflector (light reflecting pixel electrode 37) of Example 2C, instead of the electrode 26.

In this example, an example in which |d/p| was 0.33 and the retardation of the liquid crystal layer 20 is 333 nm was explained. However, they are not necessarily limited to the above-mentioned values. It was confirmed that the same effect can be exhibited when the value of |d/p| is greater than 0 but smaller than 0.5 and the product of the birefringence difference of the liquid crystal of the liquid crystal layer 20 and the thickness of the liquid crystal layer 20 is between 200 nm and 500 nm.

As described above, according to this example, good display characteristics were achieved by using the laminated phase plate (optical phase difference compensation plates 27, 28) of the present invention with the perpendicularly alignment method using the liquid crystal of the negative dielectric anisotropy.

EXAMPLE 2F

The following descriptions will explain a liquid crystal display device of Example 2F which is based on a reflective type liquid crystal display device of Example 2E, and in which a perfect perpendicular alignment was achieved without applying a rubbing treatment to the alignment films 21 and 22. As the alignment films 21 and 22, polyimide based homeotropic alignment films were used. Moreover, as the electrode 26, a reflector with smooth undulations (light reflecting pixel electrode 37) described in Example 2B was used.

The relationship between the voltage and reflectivity of the liquid crystal display device of this example was measured. As a result, substantially the same results as those in Example 2E was obtained. Furthermore, it was confirmed that this liquid crystal display device had a contrast ratio of 20, a brightness of 90% when a brightness obtained only by the polarizer 29 was set at 100%, and provided a good black-and-white display.

According to the structure of this example, even when the rubbing treatment was not applied to the alignment films 21 and 22, alignment defects were not seen. Thus, this structure has a merit of eliminating the rubbing treatment.

[Embodiment 3]

The following descriptions will explain a still another embodiment of a liquid crystal display device of the present invention as the third embodiment.

A liquid crystal display device of this embodiment is a reflected light projection type liquid crystal display device which provides a display by causing linearly polarized light to be incident on optical phase difference compensation plates and a liquid crystal layer with the use of a polarizing beam splitter as polarizing means instead of a polarizer and by projecting the reflected light.

Figure 20:
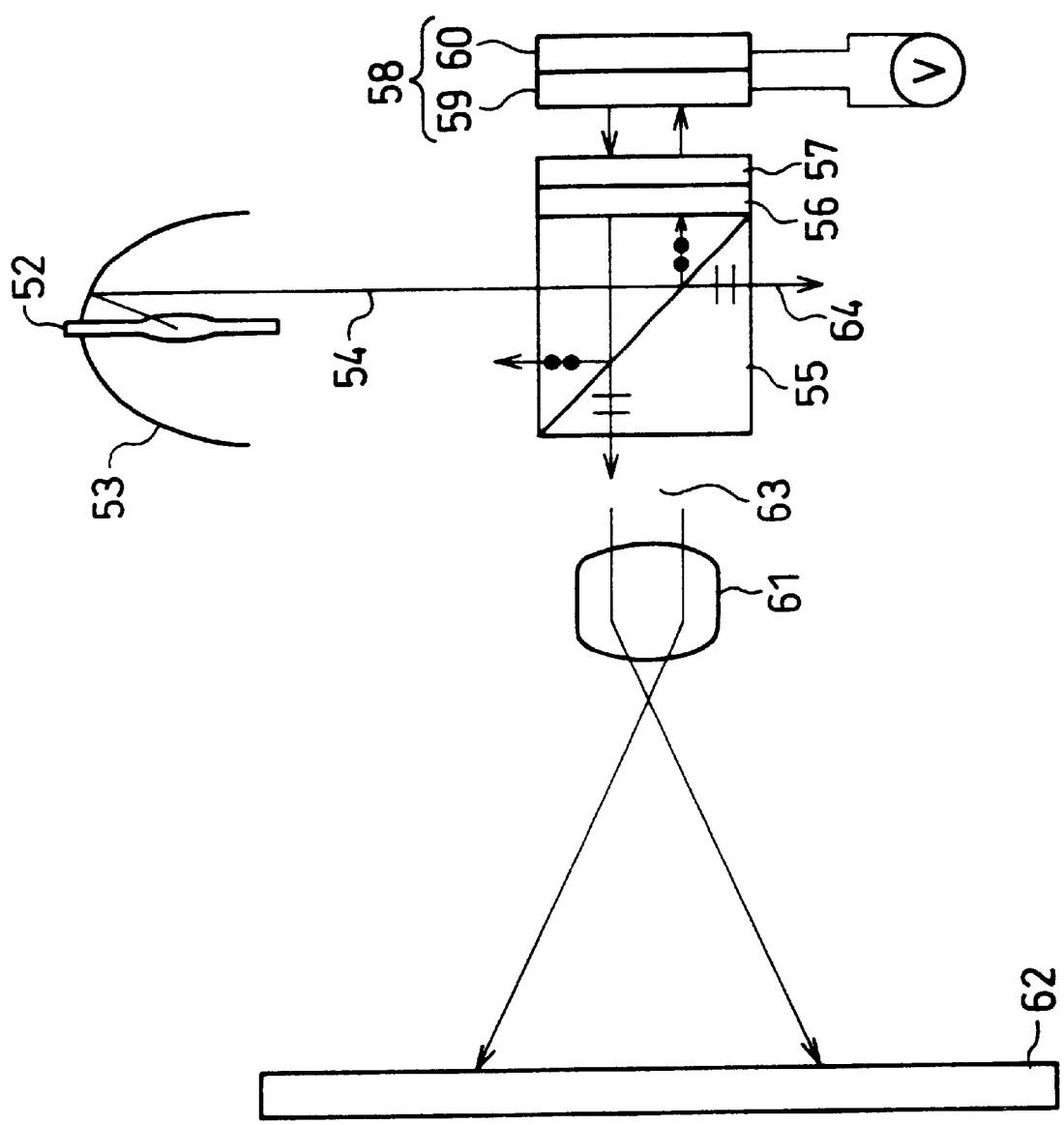
FIG. 20 is a cross sectional view of an essential section showing a schematic structure of a liquid crystal display device according to a third embodiment.

An optical arrangement in the reflective type liquid crystal display device of this embodiment is schematically shown in FIG. 20. A laminated phase plate including an optical phase difference compensation plates 56 and 57 similar to that described in the first embodiment is positioned outside (display side) of a substrate 59 of a reflective type liquid crystal display device 58.

A polarizing beam splitter (polarizing means) 55 for causing linearly polarized light which is visible light and has a fixed plane of vibration is disposed on the optical phase difference compensation plate 57 side (substrate 59 side) of the laminated phase plate.

As shown in FIG. 20, a projection light source 52 co-operates with a reflector 53 to generate substantially collimated light 54. Although it is not particularly described, an integrator or the like can be used to improve the uniformity of the illumination light. Only s-polarized light of the illumination light is reflected by the polarizing beam splitter 55. The linearly polarized light thus reflected passes through the optical phase difference compensation plates 56 and 57, becomes linearly polarized light of direction varying according to the wavelength, and is incident on the reflective type liquid crystal display device 58. The reflective type liquid crystal display device 58 achieves a reflective type display by a reflector, and may have a layer of liquid crystal homeotropically aligned in the absence of applied voltage or a liquid crystal layer having liquid crystal alignment which is parallel to the substrate and twisted.

The light incident on the liquid crystal layer of the liquid crystal display device 58 is reflected by the reflector of the liquid crystal display device 58, and passes through the liquid crystal layer again. Moreover, the light transmitted through the liquid crystal layer undergoes the polarized light converting function of the liquid crystal layer and passes through the optical phase difference compensation plates 57 and 56 from a direction opposite to the incident direction, and is then incident on the polarizing beam splitter 55 again. In addition, p-polarized component as a component of the light which has been incident on and passed through the polarizing beam splitter 55 passes through an optical system 61, and is enlarged and projected onto a screen 62. The viewer may observe the projected light from the projection side of the screen, or from the back of the screen if the screen has light transmitting properties.

Driving means of the liquid crystal layer used in this structure is not particularly limited. Active driving using a TFT, MIM (metal insulator metal), etc., or a liquid crystal light valve using a photoconductive layer may be employed.

It is possible to improve the efficiency of such a reflective type liquid crystal display device having the polarizing beam splitter 55 by setting the laminated phase plate (optical phase difference compensation plates 56, 57) of the present invention. In this case, the bright state and dark state are switched over from those of the direct viewing type liquid crystal display device. Therefore, the dark state which is important to the projection type liquid crystal display device depends on whether the polarization state on the reflector is good linearly polarized light within a visible wavelength range. In an alignment state in which the birefringence of the liquid crystal portion substantially disappears, a dark state similar to a dark state achieved without using the optical phase difference compensation plates 56, 57 can be realized by the laminated phase plate (optical phase difference compensation plates 56, 57) of the present invention. Hence, the dark state does not depend on whether the optical phase difference compensation plates 56, 57 are used.

In a bright state, a wavelength range for high brightness is made wider compared to a case where the optical phase difference compensation plates 56, 57 are not used by changing the design of the optical phase difference compensation plate (laminated phase plates 56, 57) of the present invention to expand the wavelength range for circularly polarized light on the reflector. In other words, it is possible to improve the efficiency of the bright state without deteriorating the dark state, thereby realizing a projection type liquid crystal display device with a high efficiency.

Moreover, it is possible to fabricate a head-mount display by using an optical system for adjusting the viewing angle instead of a projection optical system (optical system 61 and screen 62) and arranging the viewer to observe the liquid crystal panel from a position indicated by numeral 63 of the polarizing beam splitter 55.

In this case, needless to say, suitable illumination light is selected. Incidentally, a liquid crystal display device fabricated by adopting the present invention into such a head-mount display does not differ much from the above-mentioned projection type liquid crystal display device. Therefore, in an example given below, only the projection type liquid crystal display device will be explained.

EXAMPLE 3

The following descriptions will explain, as Example 3, an example of a projection type liquid crystal display device according to the third embodiment of the present invention using twisted homogeneous liquid crystal with a positive dielectric anisotropy as the liquid crystal layer and a polarizing beam splitter.

As shown in FIG. 20, a schematic structure of a liquid crystal display device of this example is such that a laminated phase plate (optical phase difference compensation plates 56, 57) is disposed on a side of the polarizing beam splitter 55, which side facing the liquid crystal display device (liquid crystal cell) 58.

With the use of the polarizing beam splitter 55, a reflected light projection type liquid crystal display device of this example with the optical elements arranged as shown in FIG. 18 was fabricated. Note that the liquid crystal display device 58 used in this example is an evaluation-use element for examining the efficiency of the liquid crystal layer and also a liquid crystal element in which alignment films and electrodes for sandwiching the liquid crystal layer are fabricated on supporting substrates, but active elements or the like are not particularly provided.

Moreover, the structure of the liquid crystal display device 58 is substantially the same as that shown in FIG. 9, except that polarizing means 55 and optical phase difference compensation plates 56 and 57 are separate from the liquid crystal display device 58. More specifically, a transparent electrode is formed on a light transmitting substrate 59, and a reflective electrode made of aluminum is formed on a substrate 60. Furthermore, an alignment film is formed on each of the transparent electrode and reflective electrode so that the liquid crystal layer is sandwiched between the alignment films.

Figure 21:
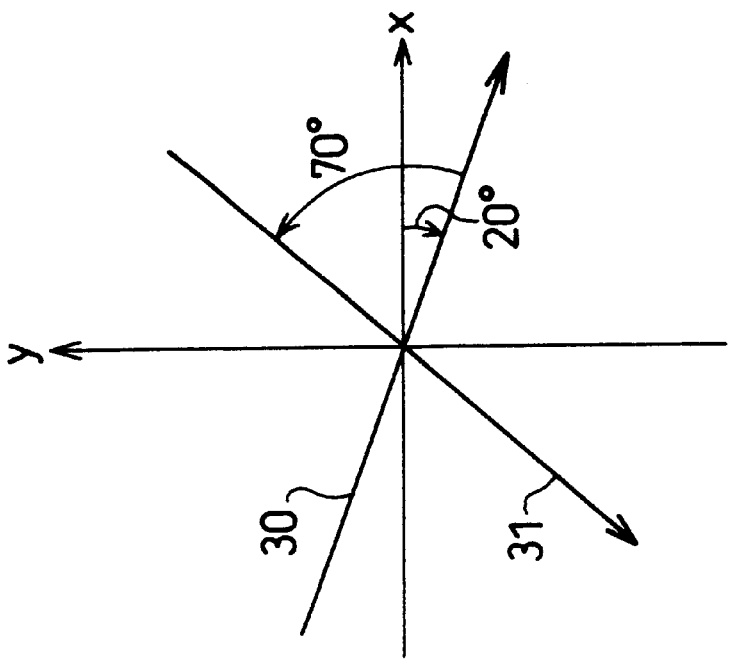
Figure 21:
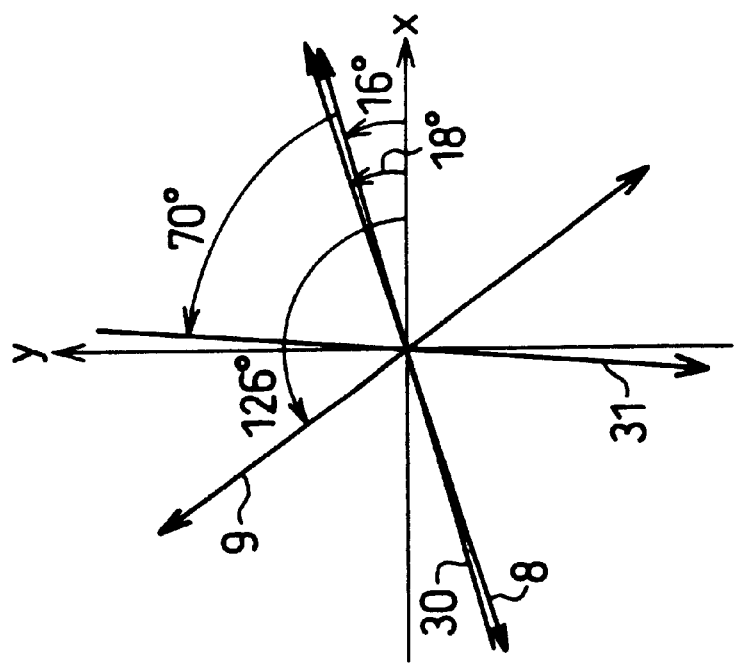

The polarizing beam splitter 55, optical phase difference compensation plates 56 and 57 of this example are positioned as shown in FIG. 21(*a*). In FIG. 21(*a*), arrow 8 shows the slow axis direction of the optical phase difference compensation plate 56, arrow 9 shows the slow axis direction of the optical phase difference compensation plate 57, arrow 30 shows the direction of alignment of liquid crystal molecules in contact with the alignment film formed on the substrate 59, i.e., in the vicinity of the substrate 59, and arrow 31 shows the direction of alignment of liquid crystal molecules in contact with the alignment film formed on the substrate 60, i.e., in the vicinity of the substrate 60. Note that FIG. 21(*a*) is a view seen along the direction of the incident light on the liquid crystal display device. Moreover, the x axis (horizontal axis) of FIG. 21(*a*) shows the direction of vibration of linearly polarized light of the polarizing beam splitter 55.

As illustrated in FIG. 21(*a*), the positional relationship of the above elements were such that the angle θ1 formed by the vibration direction (horizontal axis) of the linearly polarized light incident on the optical phase compensation plate 56 and the slow axis direction 9 of the optical phase difference plate 57 was 126°, the angle θ2 formed by the vibration direction (horizontal axis) of the linearly polarized light and the slow axis direction 8 of the optical phase difference plate 56 was 18°, and the angle formed by the alignment direction 30 of the liquid crystal molecules on the substrate 59 and the vibration direction (horizontal axis) of the linearly polarized light was 16°.

Meanwhile, for comparison purposes, a comparative reflected light projection type liquid crystal display device (hereinafter referred to as the liquid crystal display device of Comparative Example 3) which did not use the laminated phase plate (optical phase difference compensation plates 56, 57) of the present invention was fabricated with the use of the polarizing beam splitter 55. The positional relation of the liquid crystal display device of Comparative Example 3 is shown in FIG. 21(*b*). Specifically, the angle formed by the alignment direction 30 of the liquid crystal molecules on the substrate 59 and the vibration direction (horizontal axis) of the linearly polarized light was 20°.

In both of the liquid crystal display device of this example and the liquid crystal display of Comparative Example 3, the twist angle of the liquid crystal layer (the angle formed by the direction 30 of alignment of liquid crystal molecules in the vicinity of the substrate 59 and the direction of alignment of liquid crystal molecules in the vicinity of the substrate 60) was set at 70 degrees.

In other words, the liquid crystal display device 58 as the reflected light projection type liquid crystal display device of this example is similar to the direct viewing reflective type liquid crystal display device of Example 2B. Moreover, the liquid crystal display device 58 and the optical phase difference compensation plates 56, 57 disposed on a side of the polarizing beam splitter 55, which side facing the liquid crystal display device 58, are arranged in the same manner as in the direct viewing reflective type liquid crystal display device of Example 2B. The liquid crystal alignment of the liquid crystal display device of Comparative Example 3 is the same as that of the liquid crystal display device of this example and oriented in a direction that achieves the highest projection efficiency.

For both of the liquid crystal layers, the following liquid crystal layer was used. This liquid crystal layer was adjusted so that a layer thickness after introduction of liquid crystal was 4.5 μm, the difference of refractive indices Δn of liquid crystal was 0.0667, and the product of the thickness of the liquid crystal layer and the birefringence of the liquid crystal was approximately 300 nm.

Figure 22:
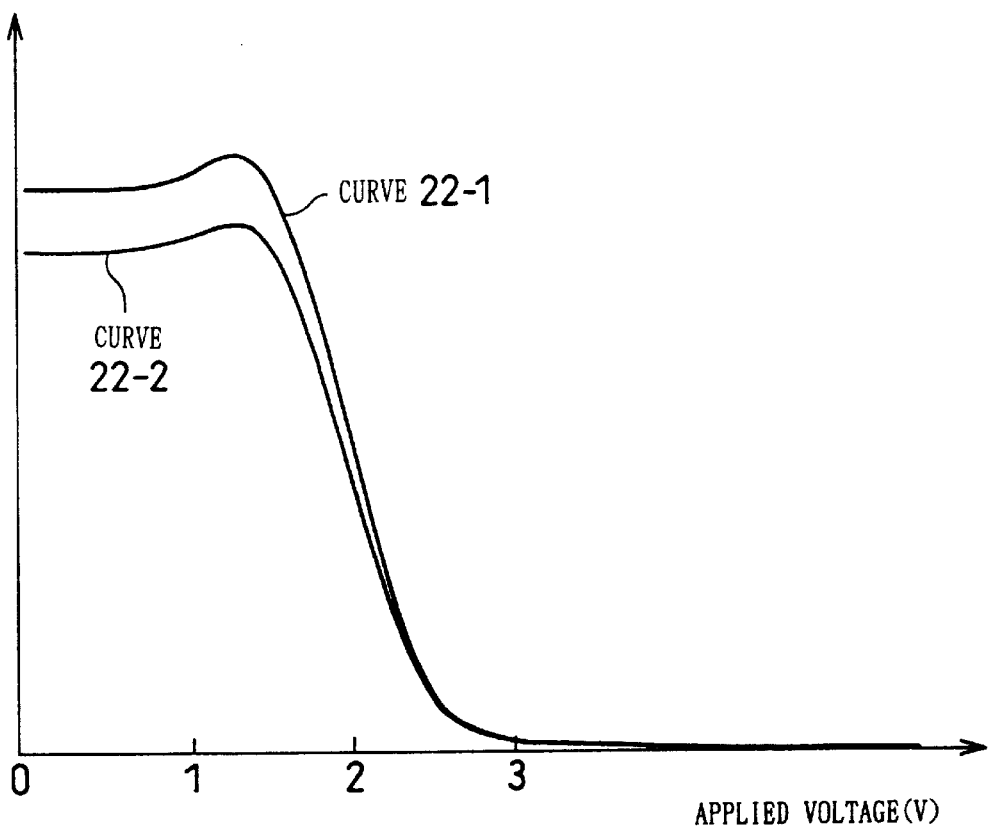
FIG. 22 is a characteristic view showing the dependencies of the projected light intensity on the voltage applied to the liquid crystal elements of projection type liquid crystal display devices of Example 3 and Comparative Example 3.

The dependence of the intensity of the projected light on the voltage applied to the liquid crystal display device 58 of the reflected light projection type liquid crystal display device thus fabricated is shown in FIG. 22. In FIG. 22, curve 22-1 shows the results of measuring the liquid crystal display device of this example, and curve 22-2 shows the results of measuring the liquid crystal display device of Comparative Example 3.

It was confirmed from the results of measurement shown in FIG. 22 that the liquid crystal display devices of this example and Comparative Example 3 had the same intensity of the projected light when the voltage was set at 3 V to produce a black display. Moreover, it was confirmed that the liquid crystal display device had a higher intensity of projected light and higher brightness than the liquid crystal display device of Comparative Example 3 when the voltage was set at 1.3 V to produce a bright display.

Furthermore, the projection efficiency of light of each wavelength within visible wavelengths of the liquid crystal display device 58 was calculated. The projection efficiency was calculated by using the intensity of light at the position 63 shown in FIG. 20 when a voltage of 1.3 V was applied to the liquid crystal display device 58 as a relative value to the intensity of light at the position 64 shown in FIG. 20. The reason for this is to avoid the effect of the emission spectrum of a light source lamp. The projection efficiency of the liquid crystal portion including the laminated phase plate (optical phase difference compensations plates 56, 57) was measured.

Figure 23:
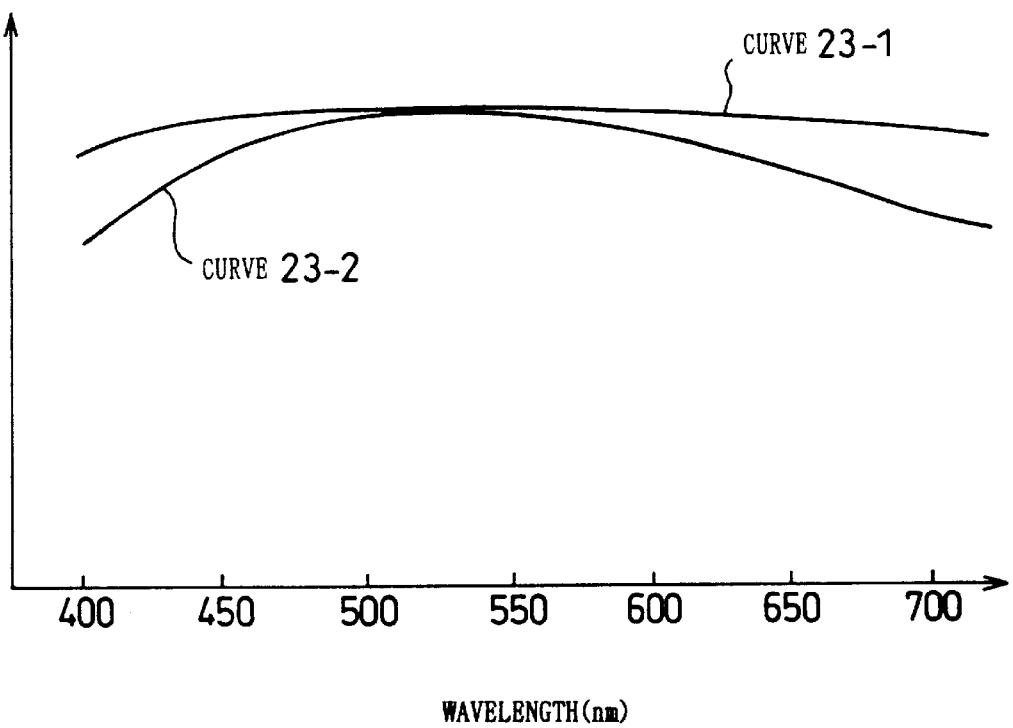
FIG. 23 is a characteristic view showing the dependencies of the transmitting efficiency in a bright state on the wavelength of projection type liquid crystal display devices of Example 3 and Comparative Example 3.

The results are shown in FIG. 23. In FIG. 23, curve 23-1 shows the results of measurement of this example, and curve 23-2 shows the results of measurement of Comparative Example 3.

It was understood from FIG. 23 that the liquid crystal display device of this example had nearly uniform projection efficiency for a wider wavelength range compared to the liquid crystal display device of Comparative Example 3. In other words, the liquid crystal display device of this example achieved high projected light intensity with high efficiency at each wavelength compared with the liquid crystal display of Comparative Example 3 and the efficiency of the liquid crystal display device was improved.

Similarly, even when an actual liquid crystal element in which TFTs, etc. were formed was used, the liquid crystal display device of this example achieved an improved efficiency compared with the liquid crystal display device of Comparative Example 3. Moreover, the projection efficiency was also improved with the use of the laminated phase plate (optical phase difference compensation plates 56, 57) of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As explained above, with the use of the laminated phase plate of the present invention, it is possible to achieve a liquid crystal display device in which the reflective film formed surface of the reflector is positioned on the liquid crystal layer side, thereby providing a good dark state. Accordingly, it is possible to realize a reflective type liquid crystal display device capable of displaying a high contrast, high definition moving picture without parallax.

Moreover, when the laminated phase plate of the present invention is used for a liquid crystal display device for projecting the reflected light or for a head-mount display, the projection efficiency can be improved.

Furthermore, according to a liquid crystal display device of the present invention, it is possible to realize a reflective type liquid crystal display device with a high reflectivity and high contrast. In addition, since the reflective film formed surface of the reflector can be positioned on the liquid crystal layer side of the transparent substrate, a good dark state can be achieved. It is therefore possible to display a high contrast, high definition moving image without parallax. Additionally, since the liquid crystal layer is perpendicularly aligned, the liquid crystal display device has particularly excellent contrast characteristics.

Besides, when a color filter adjusted for high brightness is used for a liquid crystal display device of the present invention, it is possible to achieve a reflective type color liquid crystal display device capable of providing high display quality with a good color reproduction ability.

What is claimed is:

1. A laminated phase plate formed by laminating a first optical phase difference compensation plate and a second optical phase difference compensation plate, said first optical phase difference compensation plate having a retardation between 100 nm and 180 nm for transmitted light in a direction normal to said first optical phase difference compensation plate, so as to provide a phase difference of ¼ wavelength for light of a principal visible wavelength range between 400–700 nm, said second optical phase difference compensation plate having a retardation between 200 nm and 360 nm for transmitted light in a direction normal to said second optical phase difference compensation plate, so as to provide a phase difference of ½ wavelength for light of a principal visible wavelength range between 400–700 nm, wherein when linearly polarized light having different wavelengths in a visible light range and having a fixed plane of vibration is incident on said second optical phase difference compensation plate and emerges from said first optical phase difference compensation plate, said linearly polarized light becomes linearly polarized light having different vibration plane directions for the different wavelengths.

2. The laminated phase plate as set forth in claim 1, wherein said first and second optical phase difference compensation plates are arranged to satisfy an expression $$80° \leq |\theta 1-(2\times\theta 2)| \leq 100°,$$

where θ1 is an angle between the vibration direction of the linearly polarized light or a direction perpendicular to the vibration direction of the linearly polarized light and a slow axis direction of said first optical phase difference compensation plate, and θ2 is an angle between the vibration direction of the linearly polarized light or a direction perpendicular to the vibration direction of the linearly polarized light and a slow axis direction of said second optical phase difference compensation plate.

3. A liquid crystal display device comprising:
the laminated phase plate of claim 1;
a first substrate;
a second substrate having light transmitting properties;
a liquid crystal layer formed by a liquid crystal compound including a liquid crystal, said liquid crystal layer being sandwiched between said first and second substrates, wherein said laminated phase plate is disposed on a display side of said second substrate;

polarizing means, disposed on the second optical phase difference compensation plate side of said laminated phase plate, for causing the linearly polarized light to be incident on said second optical phase difference compensation plate; and light reflecting means for reflecting at least a part of the light which has been transmitted through said second optical phase compensation plate, first optical phase compensation plate, second substrate and liquid crystal layer and gone out of said liquid crystal layer, when the polarizing means causes the linearly polarized light to be incident on said second optical phase difference compensation plate.

4. The liquid crystal display device as set forth in claim 3 wherein said liquid crystal compound has a positive dielectric anisotropy, wherein the liquid crystal between said first and second substrates has a twist angle between 60 degrees and 100 degrees, and wherein the product (d×Δn), Δn representing a difference of refractive indices of the liquid crystal of said liquid crystal layer and d representing a thickness of said liquid crystal layer, is between 150 nm and 330 nm.

5. The liquid crystal display device as set forth in claim 3, wherein said polarizing means is a polarizer.

6. The liquid crystal display device as set forth in claim 5 wherein said liquid crystal compound has a positive dielectric anisotropy, wherein the liquid crystal between said first and second substrates has a twist angle between 60 degrees and 100 degrees, and wherein the product (d×Δn), Δn representing a difference of refractive indices of the liquid crystal of said liquid crystal layer and d representing a thickness of said liquid crystal layer, is between 150 nm and 330 nm.

7. The liquid crystal display device as set forth in claim 3, wherein said light reflecting means is a light reflecting film made of a conductive material, and is provided on the liquid crystal layer side of said first substrate, said light reflecting film having smooth and continuously changing undulations on a surface thereof.

8. The liquid crystal display device as set forth in claim 7, wherein the surface of the light reflecting film having the undulations has an anisotropy that is dependent on a direction in a plane of said first substrate.

9. The liquid crystal display device as set forth in claim 7, wherein an average interval of the undulations on the surface of said light reflecting film is varied depending on a direction in a plane of said first substrate.

10. The liquid crystal display device as set forth in claim 3, wherein a plurality of protruding portions are formed on a liquid crystal layer side surface of said first substrate so that an undulating surface is formed by said protruding portions and said first substrate, wherein a planerization film for smoothing the undulating surface is formed on said protruding portions, and wherein said light reflecting means is a light reflecting film which is made of a conductive material and is provided on said planerization film.

11. The liquid crystal display device as set forth in claim 10, wherein said protruding portions are elliptical when seen along a direction normal to said first substrate and aligned so that the longer axes are oriented in a same direction.

12. The liquid crystal display device as set forth in claim 3, wherein said liquid crystal layer includes:
a liquid crystal whose alignment varies according to an applied voltage; and
a dispersed polymer with an optical anisotropy and alignment which does not vary according to an applied voltage.

13. The liquid crystal display device as set forth in claim 3, wherein said polarizing means is a polarizing beam splitter.

14. The liquid crystal display device as set forth in claim 13, wherein said liquid crystal compound has a negative dielectric anisotropy, and the liquid crystal of said liquid crystal layer is aligned in a direction perpendicular to said first and second substrates in the absence of an applied voltage.

15. The liquid crystal display device as set forth in claim 14, wherein a value of is arranged to be greater than zero but smaller than 0.5, where p denotes a natural pitch of the liquid crystal and d denotes a thickness of the liquid crystal layer, and wherein the product (d×Δn), Δn representing a difference of refractive indices of the liquid crystal of said liquid crystal layer and d representing a thickness of said liquid crystal layer, is between 200 nm and 500 nm.

16. The liquid crystal display device as set forth in claim 15, wherein said light reflecting means is a light reflecting film made of a conductive material, and is provided on the liquid crystal layer side of said first substrate, and wherein said light reflecting film has an anisotropy depending on a direction in a plane thereof, and includes smooth and continuously changing undulations, and wherein said light reflecting film functions as an electrode for applying a voltage to said liquid crystal layer with a transparent electrode provided on said second substrate as a counter electrode.

17. The liquid crystal display device as set forth in claim 14, further comprising a viewing angle compensation plate.

18. The liquid crystal display device as set forth in claim 3, further comprising a color filter.

* * * * *